United States Patent
Milenkovic

(10) Patent No.: US 11,667,035 B2
(45) Date of Patent: Jun. 6, 2023

(54) PATH-MODIFYING CONTROL SYSTEM MANAGING ROBOT SINGULARITIES

(71) Applicant: Wisconsin Alumni Research Foundation, Madison, WI (US)

(72) Inventor: Paul H Milenkovic, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 243 days.

(21) Appl. No.: 16/909,002

(22) Filed: Jun. 23, 2020

(65) Prior Publication Data

US 2021/0001483 A1 Jan. 7, 2021

Related U.S. Application Data

(60) Provisional application No. 62/869,244, filed on Jul. 1, 2019.

(51) Int. Cl.
| | |
|---|---|
| *B25J 9/16* | (2006.01) |
| *B25J 13/08* | (2006.01) |
| *B25J 11/00* | (2006.01) |

(52) U.S. Cl.
CPC ............ *B25J 9/1666* (2013.01); *B25J 9/163* (2013.01); *B25J 9/1605* (2013.01); *B25J 9/1651* (2013.01); *B25J 13/088* (2013.01); *B25J 11/005* (2013.01); *B25J 11/0075* (2013.01); *G05B 2219/40333* (2013.01)

(58) Field of Classification Search
CPC ........ B25J 9/1666; B25J 9/1605; B25J 9/163; B25J 9/1651; B25J 13/088; B25J 11/005; B25J 11/0075; B25J 9/046; B25J 9/1643; G05B 2219/40333; G05B 2219/40367
See application file for complete search history.

(56) References Cited

U.S. PATENT DOCUMENTS

| | | | | |
|---|---|---|---|---|
| 5,590,034 | A * | 12/1996 | Snell ..................... | B25J 9/1643 700/263 |
| 6,317,651 | B1 * | 11/2001 | Gerstenberger ....... | B25J 9/1664 700/245 |
| 9,981,381 | B1 * | 5/2018 | Nagarajan .............. | B25J 9/1664 |
| 2003/0171847 | A1 * | 9/2003 | Cheng ................ | G05B 19/4103 318/568.11 |
| 2003/0192758 | A1 * | 10/2003 | Murata ................. | B25J 9/1674 188/382 |
| 2005/0111938 | A1 * | 5/2005 | van der Meulen ......................... | H01L 21/67207 414/217 |
| 2005/0125100 | A1 * | 6/2005 | Stoddard ................ | B25J 9/1682 700/245 |

(Continued)

OTHER PUBLICATIONS

Aboaf, E., Paul, R., "Living With the Singularity of Robot Wrists," 1987, IEEE, pp. 1713-1717 (Year: 1987).*

(Continued)

*Primary Examiner* — Abby Y Lin
*Assistant Examiner* — Karston G. Evans
(74) *Attorney, Agent, or Firm* — Boyle Fredrickson, S.C.

(57) ABSTRACT

A controller for robot arms and the like having mechanical singularities identities paths near the singularities and modifies those paths to avoid excessive joint movement according to a minimization of tool orientation deviation to produce alternative paths that minimize changes in the tool orientation such as can affect application such as welding, sealant application, coating and the like.

14 Claims, 12 Drawing Sheets

(56) References Cited

U.S. PATENT DOCUMENTS

| | | | | |
|---|---|---|---|---|
| 2012/0303318 | A1* | 11/2012 | Milenkovic | A61B 18/18 |
| | | | | 702/150 |
| 2013/0338827 | A1* | 12/2013 | One | G05B 19/423 |
| | | | | 901/41 |
| 2013/0345868 | A1* | 12/2013 | One | B25J 9/1664 |
| | | | | 700/252 |
| 2015/0045954 | A1* | 2/2015 | Negishi | B25J 9/1607 |
| | | | | 700/262 |
| 2018/0233397 | A1* | 8/2018 | Hosek | B25J 9/104 |
| 2019/0279354 | A1* | 9/2019 | Inazumi | B25J 9/1664 |
| 2020/0338733 | A1* | 10/2020 | Dupuis | B25J 9/1666 |

OTHER PUBLICATIONS

Wang et al.; "Payload maximization for open chained manipulators: finding weightlifting motions for a Puma 762 robot." IEEE Transactions on Robotics and Automation 17, No. 2 (Apr. 2001): pp. 218-224. US.

Wampler; "Manipulator inverse kinematic solutions based on vector formulations and damped least-squares methods." IEEE Transactions on Systems, Man, and Cybernetics 16, No. 1 (Feb. 1986): pp. 93-101. US.

Milenkovic "Effect of the coordinate frame on high-order expansion of serial-chain displacement." Proceedings of the Institution of Mechanical Engineers, Part K: Journal of Multi-body Dynamics 233, No. 4 (2019): 840-855. US.

Milenkovic; "Nonsingular spherically constrained clemens linkage wrist." Journal of Mechanisms and Robotics 3, No. 1; pp. 1-8 (Feb. 2011). US.

Kim et al.; "Collision and Singularity Avoidance Path Planning of 6-DOF Dual-Arm Manipulator." In International Conference on Intelligent Robotics and Applications, pp. 195-207. Springer, Cham, 2018. Korea.

Kieffer; "Differential analysis of bifurcations and isolated singularities for robots and mechanisms." IEEE Transactions on Robotics and Automation 10, No. 1 (Feb. 1994): pp. 1-10. US.

Huang et al.; "Kinematic control with singularity avoidance for teaching-playback robot manipulator system." IEEE Transactions on Automation Science and Engineering 13, No. 2 (Apr. 2016): pp. 729-742. US.

* cited by examiner

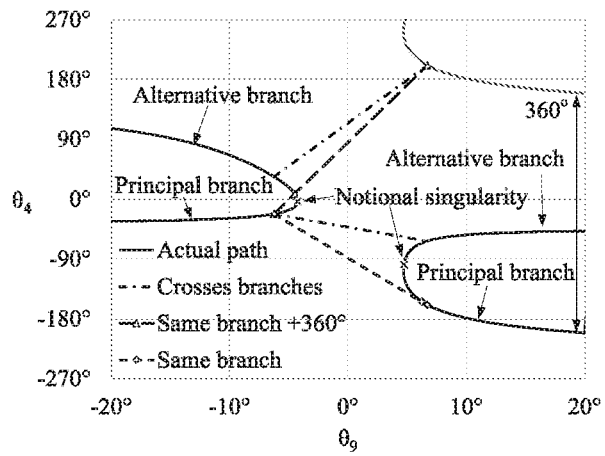
FIGURE 14
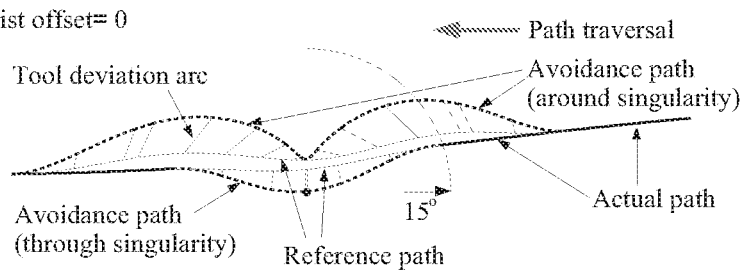
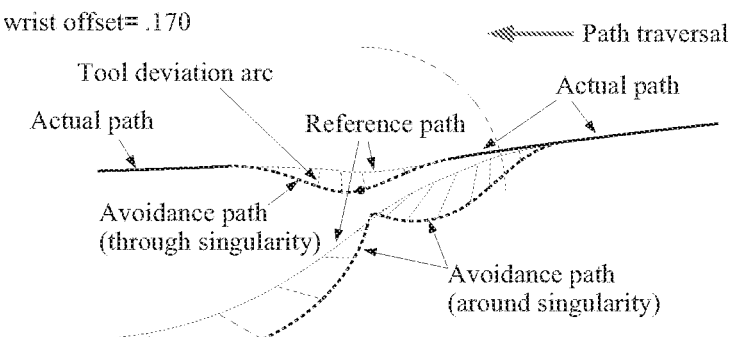
FIGURE 15a AND 15b

PATH-MODIFYING CONTROL SYSTEM MANAGING ROBOT SINGULARITIES

CROSS REFERENCE TO RELATED APPLICATION

This application claims the benefit of U.S. provisional application 62/869,244 filed Jul. 1, 2019 of which is hereby incorporated by reference.

BACKGROUND OF THE INVENTION

The present invention relates generally to robotic mechanisms providing for multiple axes of movement defined by links joined by motor driven joints, and in particular to a control system for such robotic mechanisms that can accommodate problems presented by mechanism singularities.

Robotic mechanisms (robots) have wide use in manufacturing applications where a tool held by a robotic arm is moved along a path at a controlled rate. Such applications include, for example, welding applications where a welding bead must be applied to join materials, or coating application such as painting or the dispensing of sealants. In such applications, a path describing the motion of a tool and its orientation is prepared by a programmer or programming tool. This path must then be converted into commands to move the various joints of the robot.

A typical robot arm, for example, might provide for six axes providing six degrees of freedom. For example, a robot arm may swivel about a waist joint which supports a pivoting shoulder joint which in turn supports a pivoting elbow joint, which attaches to an extension for an arm joint allowing forearm rotation, in turn attaches to a pivoting and swiveling wrist joint the latter of which is attached to a tool such as a paint sprayer, welding gun, or sealant dispenser fixed to an end link of that robot arm.

Calculating the position of the tool held by a robot arm when the relative joint positions are known (the "forward kinematic" problem) is straightforward, making use of standard trigonometric formulas applied to each joint starting at the joint attached to the robot base, which may be a movable cart or the like, to successively determine the absolute locations and orientations of the later joints along with their intermediate links until the "end" link is reached (sometimes but not always the last link in a chain of such links). This information, which describes the state of the robot position, defines a "kinematic equation". The kinematic equation may be readily expressed in a matrix form such as the Denavit-Hartenberg (D-H) matrix. That D-H matrix fully characterizes the translation and orientation of a link in an articulated mechanism from a reference position.

Calculation of the joint positions when the only the desired path of the tool is known and the relative joint positions are unknown (the "inverse kinematic" problem) is much more difficult than the forward kinematic problem, often providing multiple solutions and requiring iterative techniques. Finding practical solutions to the inverse kinematics problem is complicated by the presence of robot "singularities" which can occur, in one example, when two different axes of the robot align. This alignment effectively reduces one degree of freedom of the robot and can cause extremely high rates of joint movement in the other axes as those axes absorb the burden of movement. When the remaining axes cannot move fast enough to accommodate the singularity, smooth motion of the robot tool is disrupted, a significant problem during welding, painting or other similar operations where movement along the path must be precisely controlled. High speeds of the other joints can also unduly damage the robotic mechanism or stop operation of the robot when protecting these joints from high speed.

More generally, a singularity exists at robot joint angles where the robot degrees of freedom drop because of redundancy of different patterns of coordinated joint movement. In some robots, a singularity can be said to occur when one joint axis in the robot and one axis fixed to the end link become collinear. Singularities associated with joints having the primary purpose of orienting the tool manipulated by the robot cannot be easily segregated away from a defined operating range of the robot.

One method of addressing the problem of singularities is to modify the path to move further away from the singularity. Such approaches iteratively test whether excess joint motion occurs and adopt the first path meeting joint motion limitations without regard to optimality.

Alternatively, it has been proposed[1] to allow the tool to move through a singularity on the tool path. The singular position for this purpose is said to occur where the axis lines of the first and third joints of the robotic wrist become collinear when these axis lines intersect (for a spherical wrist) or become parallel in the absence of an intersection (an offset wrist) by adjusting the other joints before and after that movement to eliminate excessive joint velocity. The proper positioning of the joints for this purpose has not been well established.

SUMMARY OF THE INVENTION

The present invention provides a robot-mechanism controller that identifies portions of a path that will produce excessive joint motion because of the singularity and produces a modified path according to a minimization of change in orientation of the tool manipulated by the robot while preserving tool path and velocity of a designated reference point along the axis line of the tool (for example, but not limited to, a contact point between a tool held by the robot and the workpiece).

A solution for the inverse kinematics of the robot giving its joint angles while accommodating change to tool orientation is provided by solving a model of the robotic manipulator as a closed chain of links connected by joints (a closed kinematic chain) with the addition of a virtual three-axis wrist element, followed by addition of a final virtual joint element describing the intended position of the tool reference point and orientation in relation to the base of the robot.

For example, to conduct the inverse-kinematic calculations on a path adjusted to avoid excessive joint rates, a 6-joint robot would be embedded within a 9-joint closed-loop kinematic chain. The initial joint of the 3-joint virtual wrist shares the same axis line as the final joint of the robot, and both are treated as joint 6. Part of the proposed method is how to separate the angle on the combined joint 6 into the portion in the physical robot that needs to be actuated and the remaining portion that appears only on the virtual joint 6. Hence the 3-axis virtual wrist introduces only two new axis lines, 7 and 8. Finally, articulation about virtual axis line 9 constitutes a model representing the intended position and orientation of the tool manipulated by the robot.

In one embodiment, the proposed method controls the robot joints so the actual tool position meets the intended position exactly, and the actual tool orientation meets the intended orientation approximately.

Subject to limits on the velocity and acceleration of articulation of a joint in the robot, the method may also optimize the amount the tool deviates from its intended orientation along with the length of the path interval over which such orientational deviation occurs.

Specifically, in one embodiment, the invention provides a robot control system for a multi-axis robot having multiple links including an end link defining a tool position, the links movable with respect to each other at joints defining axes and having sensors and actuators for movement of the joints about the axes by the actuators according to the sensors subject to joint movement rate limits, the joints and links configured so as to present at least one singularity. The controller includes an electronic circuit communicating with the actuators and sensors at each joint and executing a stored program to: (a) receive path instructions defining a path of desired changes in tool orientation along with desired velocity of the tool position;
(b) identifying at least one unmodified path portion proximate to the singularity exceeding at least one joint movement rate limit at the desired positional velocity; and
(c) identifying a modified path portion providing the desired velocity with resulting tool position without exceeding any joint movement rate limits according to a minimization of a maximum deviation of a tool orientation of the modified path portion from the desired tool orientation.

It is thus a feature of at least one embodiment of the invention to provide modifications of a robot path that mitigates the effects of singularities while also minimizing tool deviation. While other techniques for avoiding the problems of singularities exist, they cannot provide any assurance about minimizing changes in tool orientation which may be important in applications such as welding, coating and the like.

The modified path may not intersect the singularity or may intersects the singularity.

The present inventor has recognized that there is a class of "actual singularities", for example in a spherical rest when the first and third axes become collinear, but only a "notional" singularity, in an offset wrist when the first and third axes become parallel. This latter singularity is termed "notional" because the condition of joint rates becoming excessive may occur close to but not at this "notional" singularity. As used herein, "singularity" will refer to both actual and notional singularities.

It is thus a feature of at least one embodiment of the invention to provide a generous solution set that includes both paths that avoid and confront the singularity for the purpose of finding minimum tool deviation.

The controller may receive path instructions describing at least one region where path rerouting is prohibited and step (c) may identify the modified path portion to minimize the deviation among alternative unmodified paths not including the at least one region.

It is thus a feature of at least one embodiment of the invention to provide a versatile rerouting system that can accommodate application-specific limitations to robot motion that may occur for example when there is interfering structure or the like.

Step (c) may further identify a modified path portion according to a minimization of a length of the modified path portion.

It is thus a feature of at least one embodiment of the invention to minimize the length of the modified path and thus the disruption to the manufacturing process implemented by the robot.

Step (c) may further identifies a modified path portion that limits joint maximum velocity or acceleration among joints of the multi-axis robot to a predetermined value.

It is thus a feature of at least one embodiment of the invention to allow improvement of the velocity or acceleration profiles beyond those defined by the limits of joint motion.

Step (c) may further identify a modified path portion according to a predetermined lower limit of a length of the modified path portion.

It is thus a feature of at least one embodiment of the invention to allow the programmer to control the modification process to limited sections Step (c) may model the robot as a closed kinematic system consisting of a base comprising a first link in that system supporting a first joint of the robot, through the joints of the robot then through a three axis virtual wrist sharing one axis with a final axis of the robot and then through a virtual joint connecting to a link on the path that is rigidly connected to the first link.

It is thus a feature of at least one embodiment of the invention to provide an improved method of managing joint singularities through the introduction of a virtual wrist into the closed kinematic model.

The virtual three axis wrist may be constrained so that a first and third joint of the three axis wrist are constrained to move by equal and opposite angles. Alternatively or in addition, the virtual three axis wrist may be constrained so that a second joint is perpendicular to a second joint in the robot wrist comprising the final three joints of the robot.

It is thus a feature of at least one embodiment of the invention to allow the wrist to accurately account for tool deviation thereby allowing optimization.

These particular objects and advantages may apply to only some embodiments falling within the claims and thus do not define the scope of the invention.

BRIEF DESCRIPTION OF THE DRAWINGS

FIG. 14 shows a robot of FIG. 12 with wrist offset restored to 0.17 m at 2° tool deflection;

FIG. 15 shows stereographic maps of wrist articulation for the robot of FIG. 12 showing optimal through-the-singularity (FIG. 15a) and around-the-singularity maneuvers (FIG. 15b) satisfying joint rate and acceleration limits for a spherical wrist (zero offset) and a wrist with 0.170 m offset;

DETAILED DESCRIPTION OF THE PREFERRED EMBODIMENT

Discussion of Robot and Controller Hardware

Figure 1:
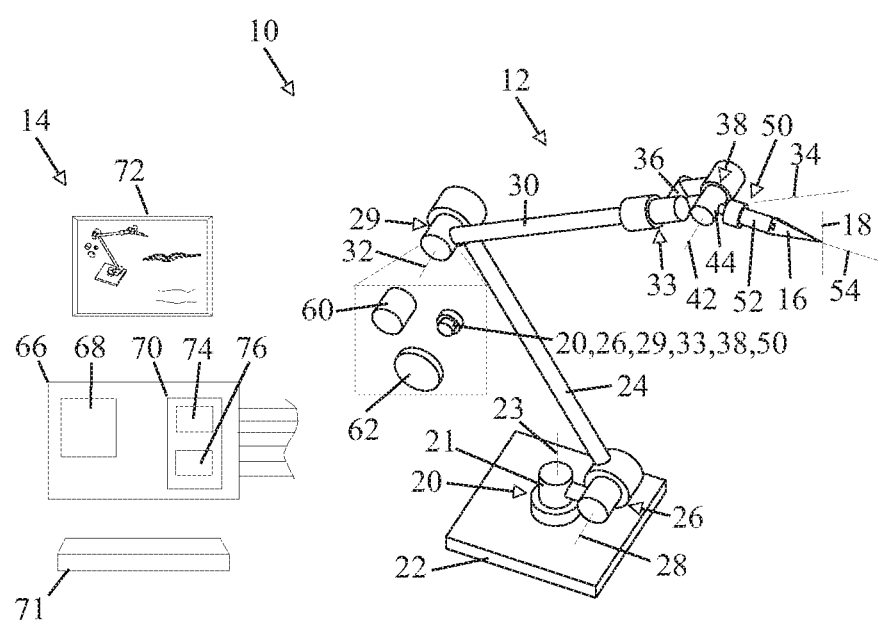
FIG. 1 is a perspective view of a six axis robot arm suitable for use with the present invention showing the various axes links and orientations for moving the tool along a path and a controller for controlling the same.

Referring now to FIG. 1, a robot system 10 may include robot arm 12 operated by a controller 14 to move a tool 16 along a defined path 18 and at a controlled trajectory with a particular tool angle with respect to that path 18.

In one example, the robot arm 12 may provide for six axes or 6 degrees of freedom implemented by a set of six joints including a first joint 20 positioned between a stationary base 22, for example, attached to the floor and a first vertical link 21 and providing rotation about a vertical first axis 23 generally aligned along the extent of the vertical link 21. The first link 21 in turn attaches to a second link 24 through rotative joint 26 having a horizontal second axis 28.

The second link 24 in turn connects to third rotative joint 29 communicating between the second link 24 and a third link 30 and movable about a third axis 32 parallel to second axis 28. The third link 30 attaches to a fourth rotative joint 33 rotatable about a fourth axis 34 generally along the extent of the third link 30 and perpendicular to the third axis 32 and communicating with a fourth link 36. The fourth link 36 attaches to a fifth rotative joint 38 connecting the fourth link 36 to a fifth link 44, the fifth rotative joint 38 rotating about a fifth axis 42. The fifth link 44 communicates through a sixth joint 50 with an end link 52 holding the tool 16. The sixth joint 50 rotates about an axis 54 extending generally along the extent of the sixth link 44 and end link 52 and perpendicular to axis 42.

Each of the joints 20, 26, 29, 33, 38 and 50 are associated with an actuator 60, for example, an electric motor that may turn the portions of the respective joint with respect to each other and a sensor 62 that may measure the relative angle between the portions of that joint as moved by the electric actuator 60. The electric actuator 60 and sensor 62 for each joint may communicate with a controller 66, for example, providing a computer processor 68 communicating with electronic memory 70 and providing analog-to-digital and digital to analog converters (not shown) for receiving and providing signals to the sensor 62 and actuator 60 for control of the robot arm 12.

The controller 66 may provide for an input device 71 such as a keyboard, disk drive, or network connection for receiving information and may provide for output information for example on the screen 72 or the like. The memory 70 may hold an operating program 74 as will be described and a path file 76 describing a desired path 18 as well as standard controller software (not shown) known in the art for feedback control, for example, providing for proportional/integral/derivative control loops and the like.

Figure 2:
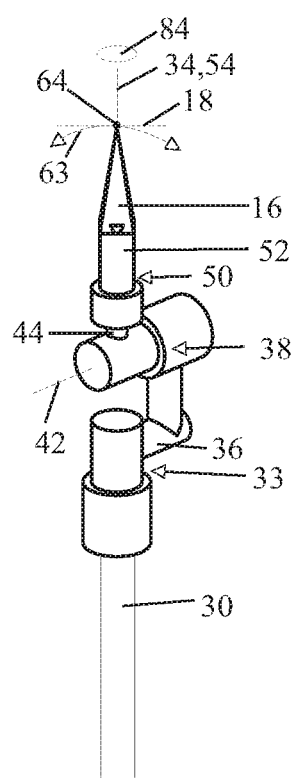
FIG. 2 is a fragmentary detail of the final three axes of the robot arm of FIG. 1 comprising a wrist and showing the wrist in a singularity with two wrist joints code linear.

Referring now to FIG. 2, when axes 34 and 54 are aligned as shown, the freedom of motion of the wrist 60 of the robot (comprising axes 34, 42, and 52) as measured at a reference point 64 on the link 52 is instantaneously limited to motion only about axis 42 of depicted arc 63. This sudden loss of degrees of freedom is characteristic of a singularity 84 where the wrist is unable to implement motion perpendicular to the tangent of arc 63. As depicted in FIG. 2, the tool—extending from the axis of the 6$^{th}$ robot joint, 3$^{rd}$ wrist joint labeled 50—loses this degree of orientational freedom when axes 34 and 54 are aligned, resulting in the singular posture labeled 84. This limitation of motion can require excessive rates (velocities) in other joints attempting to compensate for this singularity when following a path in both desired orientation changes and positional velocity, such excessive joint velocities producing either excessive wear in those joints or if limited by features of the robot 12 (e.g. joint rate limiters or inherent physical limitations), can prevent manipulating the tool 16 along the desired path 18.

Figure 3:
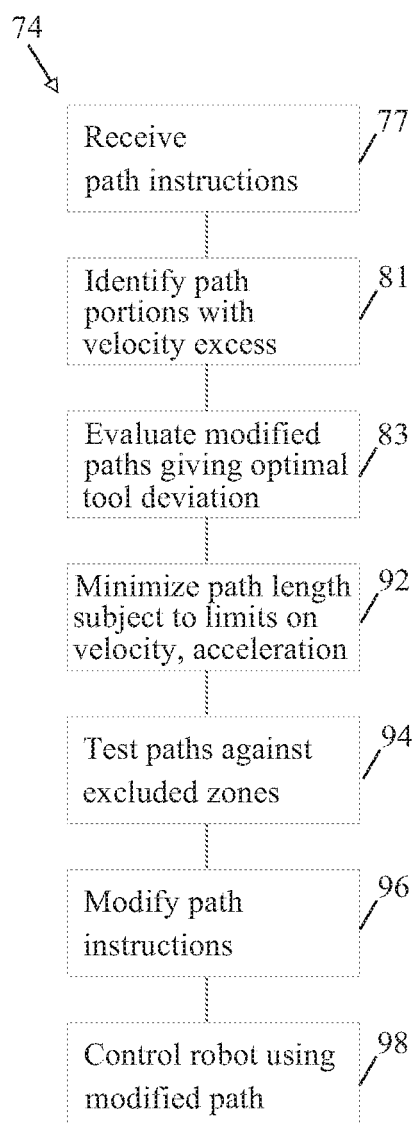
FIG. 3 is a flowchart of a program executable by the controller to control the robot arm to follow the path in the vicinity of the singularity.
Figure 4:
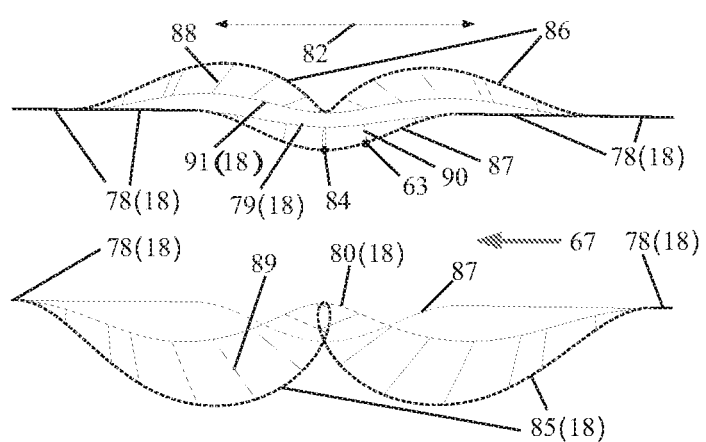
FIG. 4 a simplified representation of the tool path and the path of the end link of the robot arm in a path moving near a singularity and into alternative paths provided by the present invention.

Referring now also to FIGS. 3 and 4, the controller 66 executing the program 74 may, as indicated by process block 76, receive path instructions defining a desired path 18 as shown in FIG. 1 and FIG. 4. Portions of path 18 in FIG. 4 have the different depictions 78, 91, 79 and 80 owing to the effects of differing amounts and orientations of tool-deviation arcs 88, 90 and 89 on the stereographic-map representation of orientation in FIG. 4 and not any differences in path 18. As will be understood, the tooltip 64 desirably follows the path 18 having tool orientation changes along with tool positional velocities 67 defined by the received path instructions. During this time the end link 52 may follow an actuator path such as 87 displaced from the desired tool path, 18, for example at the reference point 63 on actuator path 87 that is displaced by segment 90 depicting a deviation from the desired orientation on 79 representing desired path 18 on that portion of the map projection.

As indicated by process block 81, in this example, the program 74 may identify a region 82 of the path 78, where the actuated path matches the desired path in both orientational change and positional velocity, that will result in excessive joint motion as a result of its proximity to a singularity 84 representing the alignment of axes 34 and 54. Note that the singularity 84 being defined by the wrist angles of the wrist which moves in space may occur at various absolute locations within the reach of the robot 10.

At process block 83, and as will be discussed in greater detail below, the program 74 evaluates alternative actuator paths, for example, actuator paths 86, 87 and 85 that all allow the tooltip 64 to maintain the desired positional velocity 67 but deviate in angles depicted by 88, 90 and 89 that initially may be sub optimal, from the desired orientational paths 91, 79 and 80. Importantly, at process block 83, the program 74 identifies these alternative paths 86, 87 and 85 to minimize a maximum deviation of the type represented by 88, 90 or 89 in the region 82.

At succeeding process block 92, program 74 may correct the paths that minimize maximum deviation 88, 90 or 89 to meet achievable limits on joint axis angular velocity (joint rate) and/or acceleration of joints in the robot. The resulting path length will be the least amount meeting a designated limit on rate and acceleration within the achievable range, where the designated limit may also be based on input from the user.

As indicated by process block 94, optimized paths 86, 87 and 85 may then be compared against excluded zones, for example, indicating regions where there will be physical interference between the tool 16 and other structure surrounding the robot 12. Paths among 86, 87 or 85 within that excluded zone are excluded. The result is a set of modified path instructions incorporating, for example, depicted path 86 that minimizes each of tool deviation 88, path length, and path joint velocity and acceleration, as indicated by process block 96.

Per process block 98 a qualified, alternative modified path is then used instead of path 78 in the region 82. Note generally that paths 87 may pass through the singularity, which may in fact result in the least deviation 90 under certain situations.

Figures 5, 6:
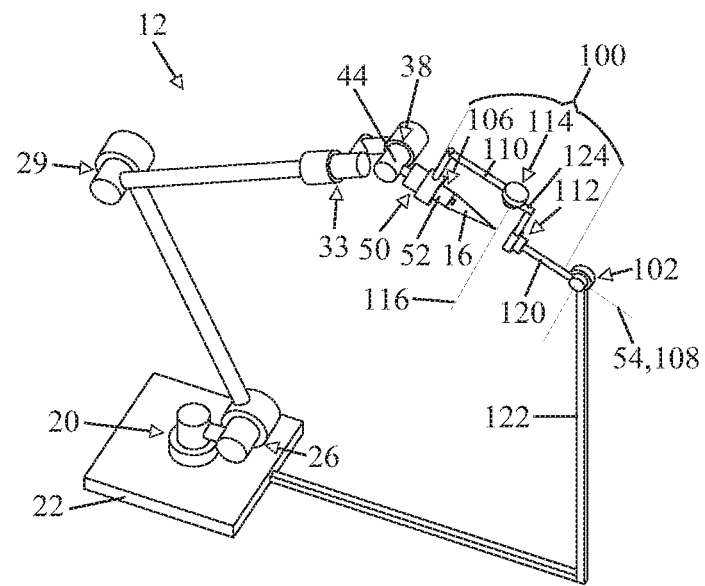
FIG. 5 is a figure similar to FIG. 1 showing the addition of virtual joints used for the inverse kinematic processing of the present invention.
FIG. 6 shows in its upper portion a non-singular wrist and in its bottom portion a singularity-avoidance wrist.

Referring now to FIG. 5, the determination of paths 86, 87 and 85 optimized with respect to joint velocity and acceleration and path length are performed by creating a closed kinematic model of the robot arm 12 for example as shown in FIG. 1 but including a virtual wrist 100 and loop closing joint 102. The virtual wrist 100 shares a first joint axis with the robot 12 so that link 52 attaches to a virtual rotary joint 106 having an axis 108 collinear with the axis 54 of joint 50. This joint 106 connects link 52 to virtual link 110 which in turn connects to virtual rotary joint 114 having an axis 116. Link 124 in turn connects joint 114 to rotary joint 112. Joint 112 in turn connects to a virtual link 120 which communicates with virtual joint 102 between link 120 and link 122 providing a closed kinematic loop returning to a position stationary with respect to the base 22.

Detailed Discussion of Evaluation Controller Software

A 6-axis robot having a spherical roll-pitch-roll wrist allows as much as ±145 $deg^2$ pointing deflection from the major axis of the forearm. This dexterity comes at the cost of a wrist singularity at the center of that pointing cone. Commanding a constant-rate sweep of the final wrist axis through near alignment with the initial wrist axis can exceed hardware limits on joint rates, a concern in seam welding, coating application or other tasks requiring continuous motion. This problem occurs even in a 5-axis robot[3] when an axisymmetric tool eliminates the need for the last roll axis. The robot arm singularities can be avoided by staying away from the overhead position and inside the usable envelope of the arm[4]. The wrist singularity merits special consideration because it can occur anywhere inside that workspace.

To free the workspace, the pitch-yaw-roll wrist places its 180-deg separated pair of wrist singularities along the equator to the major forearm axis s. Mechanical interferences will limit the pointing cone to less than the full hemisphere. Non-singular 2-axis wrists coordinate articulation of a series pair of universal joints[6-9]. Interferences limit one such wrist to a hemisphere[8] whereas two others are limited to a pointing cone of ±100 deg[6,9], perhaps explaining the absence of these wrists in commercial painting robots[2,10] Another 2-axis pointer makes the tool oblique to the final axis in a redundant roll-pitch-roll wrist; its pointing cone is also less than a hemisphere[11]. The reduced pointing range of these alternatives motivates methods for tolerating the wrist singularity of existing robots.

The wrist singularity also marks a bifurcation between displacement paths, one where the wrist pitch angle (on what is joint 5 of the robot) passes through zero and another where this deflection stays zero and the wrist spins about the aligned axes of roll joints 4 and 6. Low-order path following methods are reported to stay on one of these two paths if that path happens to pass directly through the singularity[12]. Such is subject to the restriction of starting a tracking step some distance before the path bifurcation and taking a long enough step to emerge on the other side[13]. A path intended to pass directly through the singularity, however, may pass nearby owing to numerical approximation. A path passing near the singularity poses special challenges, even during the path planning phase where physical rate limits do not apply, as a path-following method can jump paths at the sudden onset of high joint rates[14].

Huang et al.[15] classifies singularity avoidance into 1) regularization of the robot Jacobian matrix[16-21], 2) use of kinematic redundancy to replace degrees-of-freedom that lose effectiveness[4,21-25] and 3) interpolation of joint angles between inverse-kinematic solutions on each side of the singularity. Regularization methods[16-18,26] produce deviations in both the tool position and orientation near the singularity. Modifications have been proposed to control those errors[18,27,28]. Whereas redundant actuation removes singularities specific to parallel robots[29], a serial robot already actuates all joints.

Motivated by seam welding, Huang and Milenkovic[30,31], Aboaf and Paul[32], and Cheng et al.[1] enforce positioning of the tool contact with the work surface while tolerating deviation in the tool orientation resulting from limited joint rates. In obtaining redundant degrees of freedom by allowing the tool to deviate in orientation, these methods are in class 2 of Ref.[15]. Reference[1] avoids high joint rates bypassing through the singularity instead of slewing the wrist joint nearly 180 deg when passing close by. This method interpolates one joint angle and corrects two others, placing it in class 3.

The Preferred Embodiment plans and executes a through-the-singularity maneuver that 1) limits joint rates, 2) tolerates a deviation in tool orientation, 3) enforces the required tool position at the work surface along a continuous curve and 4) meets these conditions without slowing the tool traversal. Its improvements over the prior methods with these capabilities[1,30-32] are 1) achieving the least-maximum deviation in tool orientation (the smallest value of the peak magnitude occurring along the maneuver) and 2) also limiting joint acceleration. Besides its theoretical significance, global optimality supplies a benchmark to quantify performance loss resulting from the kinematic approximations made in the prior methods. This optimality is achieved by extending the robot wrist with a 3-joint virtual wrist. New procedures incorporate control of the resulting redundancy into a rapid, high-order kinematic power-series expansion[33]—see Appendix A. This expansion allows a small number of displacement steps to 1) locate the wrist singularity, 2) articulate the wrist to joint angles at that location giving an optimal path, 3) follow that path back to a zero-deviation starting point meeting rate and acceleration limits on a key wrist joint and 4) execute the through-the-singularity maneuver in its forward direction.

Robot with Singularity Avoidance Wrist

FIG. 6 contrasts two solutions to the singularity problem. A non-singular wrist 6 splits a pointing deflection into two smaller deflections of equal magnitude on back-to-back pitch-yaw pointers (joints 6 and 5, 7 and 8). The smaller deflections are within the non-singular working space of each pointer. The pointers are coordinated by a path-independent mechanical constraint.

In the Preferred Embodiment, a singularity avoidance wrist consists of back-to-back roll-pitch-roll wrists. A physical wrist and a virtual wrist are initially rolled 90 deg with respect to each other. Neighboring physical and virtual joints, however, share the same axis and are merged into joint 6 in FIG. 6. The physical wrist is singular in FIG. 6 where joints 4 and 6 are inline. The center of the virtual wrist is placed at the tool contact point with the work surface. Even with the physical wrist center point offset from this location, articulating the virtual wrist maintains that contact point. As shown in FIG. 6, virtual joint 7 supplies the missing mobility along an axis perpendicular to joints 4 and 5. One kinematic solution locks joint 6 and limits the rate of joint 4, leaving joints 5, 7 and 8 as a non-redundant wrist of full mobility. To keep the tool deviation angle within an acceptable range, articulating the physical wrist should produce the bulk of any orientation change with the virtual wrist supplying a small adjustment. A satisfactory solution will depend on the placement and rate of traversal of a displacement path in proximity to the singularity.

Other singularity avoidance wrists add only one virtual[34] or physical joint[35]. The wrist with an extra physical joint can achieve zero tool deviation in both orientation and contact position. Both wrists lack a path-independent rule for coordinating their redundant joint. As a consequence, the physical joint cannot be passively actuated with a mechanical constraint as afforded by symmetry of the non-singular wrist. The virtual joint of Ref.[4] is in a physical wrist offset from the work piece. Tool deviations in both orientation and contact position occur when this joint is removed during robot operation.

Prior methods enforce tool position[1,30-32] without joints bridging the robot tool to its target position and orientation. Apart from Ref.[32], a two-stage iteration at each path point was deemed necessary to obtain a kinematic solution under these conditions. The first stage adjusts the physical wrist to meet a constraint on the tool deviation angle. The second stage adjusts the robot arm to correct the resulting position error. The angle error introduced by the second stage is corrected in the next iteration. This procedure lacks the fast convergence of Newton's method, but its speed and reliability were judged acceptable for offline path planning[30]. The method of Aboaf and Paul[32] applies matching rotational transformations to the "Cartesian rates" (combined angular and translational velocity vector) $\dot{x}$ and the robot Jacobian J (see Eq. (1) of Ref.[32]). These terms are expressed at the tool contact with the work surface. The two rotations align the desired tool deviation axis with a canonical axis direction corresponding to a row of J. This row is removed after a rate limit applied to joint 4 in the physical wrist eliminates a column of J. This work is widely cited for eliminating the degeneracy of a nearly singular Jacobian[14,18,19,28,34]. It also implements a kinematic path predictor tracking the tool position. The tool deviation is represented implicitly by the uncorrected rotation along the missing canonical axis. The uniqueness of this capability among singularity avoidance methods is perhaps not as well known.

In what follows, coordinated displacements of the initial and final roll joints in the virtual wrist align the axis of the tool deviation. The displacement of the central pitch angle in the virtual wrist will be shown to represent the tool deviation itself. Predictor-corrector path tracking is applied to a serial robot with the avoidance wrist. This explicit representation of the path deviation separates the accumulated tool deviation, which the corrector should retain, from series truncation error or calibration differences between the model and the robot, which the corrector should remove. An accurate high-order predictor of the current step combined with a corrector of the preceding step[36,37] will allow rapid calculation of large displacement steps.

Figure 7:
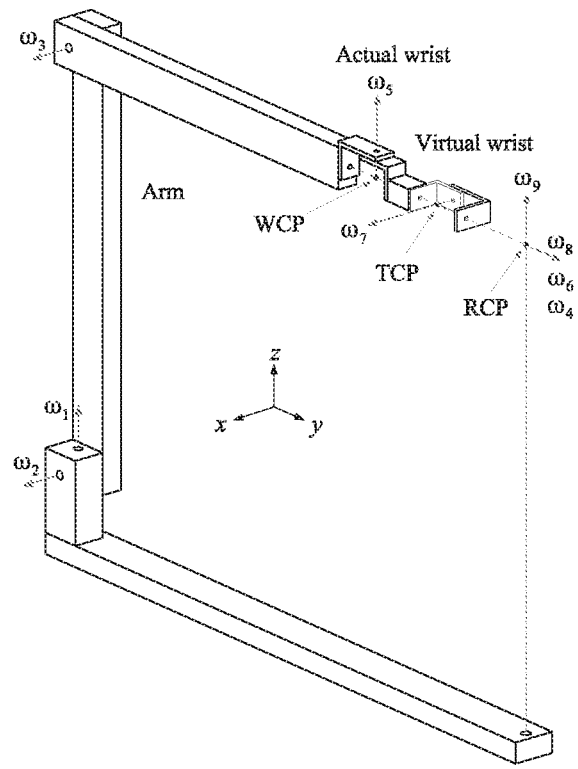
FIG. 7 shows an anthropomorphic arm with singularity-avoidance wrist in the reference singular posture.

FIG. 7 shows the singularity avoidance wrist attached to an anthropomorphic robot arm. All joint angles are designated to be at zero in this reference posture. In this particular example, a 1 m offset separates joints 2 and 3 as well as joints 3 and 5. The offset between joints 5 and 7, the separation between the wrist center point WCP and the center of the virtual wrist at the tool contact point TCP, is 0.2 m. Rotating the tool about virtual joint 9 is the motion to be generated by actuating joints in the robot. The axis of this joint passes through the rotation center point (RCP). The offset between joints 1 and 9 is 1.5 m.

The tool deviation is the change in body orientation resulting from articulation of the virtual wrist connecting the actual tool attached to physical joint 6 to its intended posture on the link attached to joint 9. Because the joints of the virtual wrist intersect at the TCP, articulation of this wrist varies the tool deviation without disturbing the position of the TCP.

Angle $\theta_7$ gives the rotation about joint 7 that redirects the axis of joint 6 to align with that of joint 8. The links in the virtual wrist hold unit axis direction vector $\omega_7$ of this rotation perpendicular to the plane containing $\omega_6$ and $\omega_8$, which also makes $\omega_6$ trace a great-circle arc on the surface of the unit sphere where this plane intersect its equator. Given this relative alignment of those axes, the following establishes the conjugate angle condition $\theta_8 = \theta_6$ under which $\theta_7$ is the least angle in an angle-axis representation of the tool deviation.

Lemma 1: When $y = R_\omega(\theta)x$ represents rotation by angle $\theta$ about axis $\omega$ by the 3×3 matrix $R_\omega(\theta)$, $R\, R_\omega(\theta)\, R^T$ represents rotation by $\theta$ about rotated axis $R\omega$.

Proof: For $\hat{y} = Ry$, $\hat{y} = RR_\omega(\theta)x = RR_\omega(\theta)R^T Rx = RR_\omega(\theta)R^T \hat{x}$. The rotation transformation $\hat{x} = Rx$ preserves lengths and angles because inner product $\hat{x}^T\hat{x} = \hat{x}^T R^T R \hat{x} = x^T x$. Hence $\hat{y} = R y$ is $\hat{x} = Rx$ rotated by the same angle $\theta$ about axis $R\omega$. □

Theorem 1: Unit vectors $r_i$ and $r_f$ select points on the unit sphere. Apart from $r_i = \pm r_f$ constituting the same or diametrically opposed points on the sphere, the unique great-circle arc between these points gives the path length on that sphere connecting those two pointing directions.

Proof: Axis $\omega_\perp$ is perpendicular to the plane containing $r_i$ and $r_f$; $\omega_\perp$ points to the side of the plane where its right-hand rotation of $r_i$ by $0 < \theta < 180$ deg gives $r_f$. Vector $r_0$ rotates about $\omega_\perp$ to trace its equator. Both $r_0$ and $r = R r_0$ trace continuous paths connecting $r_i$ and $r_f$. Holding R constant, the Lemma establishes r to trace a great-circle arc of length $d\theta_0$ when $r_0$ traces the same arc length along the equator. Next, R may be varied in a way that r traces an arc of length $d\Omega$ that is perpendicular to the $d\theta_0$ arc. A segment of the path traced by r may be represented by an arc forming the diagonal to a spherical right triangle with sides $d\theta_0$ and $d\Omega$. This arc has $d\Sigma \geq d\theta_j$. The path lengths of r and $r_0$ therefore satisfy $\Sigma \geq \theta_0 \geq \theta$, with $\theta_0 = \theta$ when $r_j$ does not reverse direction. Hence any path departing from the $r_i$, $r_f$ plane has cumulative instantaneous rotation angle $\Sigma > \theta$; $\Sigma = \theta$ occurs along a great-circle path, establishing the well-known minimum arc length between points on a sphere.

Theorem 2. For $\psi$ the cumulative rotation angle about instantaneous axis $\omega_\phi$ generating a path on the unit sphere connecting the end points, $\Sigma$ the length of that path and $\theta$ the arc length of the great circle traced by rotation by that angle about fixed axis $\omega$ giving $\Sigma \geq \theta$, it follows that $\psi \geq \Sigma \geq \theta$, with $\psi = \theta$ achieved for constant $\omega_p = \omega$.

Proof. Unit vector r rotated about instantaneous axis $\omega_\phi$ with angle $\phi$ between r and $\omega_\phi$ traces a circle of radius $\sin \phi$. The length of segment $d\Sigma$ traced on the surface of the unit sphere is bounded by $\|d\Sigma\| = |\sin \phi\| d\psi| \leq |d\psi|$, establishing the inequality after integrating angle $\psi$ and path length $\Sigma$.

Theorem 3: Displacing a roll-pitch-roll wrist by joint angles $\theta_6$, and imposing the condition of conjugate joint angles $\theta_8 = -\theta_6$, the minimum rotational displacement $\theta$ about an axis direction $\omega$ between the pair of rigid bodies connected by the 3-axis virtual wrist is achieved by $\theta = \theta_7$ and $\omega = \omega_7$.

Proof: For a great-circle arc traced by rotation $R_7$, the Lemma establishes that $R_6 R_7 R_6^T$ traces an arc of the same length. Theorems 1 and 2 establish this arc length to give the minimum rotation angle connecting the pointing directions at the ends of the arc. This in turn gives the minimum angle in the angle-axis representation of the change in body orientation achieving the required change in pointing direction.

Upon dividing joint 6 into actual and virtual angles according to $\theta_6 = \theta_{6W} + \theta_{6T}$, actuating the physical wrist with angle $\theta_{6W} = \theta_6 - \theta_{6T} = \theta_6 + \theta_8$ maintains conjugate virtual angles $\theta_{6T} = -\theta_8$. The deviation in tool orientation is $\theta_7$ therefore quantified by the single scalar value $\theta_7$. Adjusting the combined actual and virtual angle $\theta_6$ directs the sweep of joint 7 to change $\theta_7$. In this manner, using three virtual joints simplifies control of the tool deviation at each point along a displacement path to a single-input single-output system. In a 5-axis robot $-\theta_{6W}$ gives the amount of uncorrected tool roll along the missing axis of joint 6. When such a 5-axis robot directs an axisymmetric tool, this additional tool deviation may be safely disregarded. Such also establishes that under the conjugate-angle condition, the virtual wrist produces a pure change in pointing direction of the tool without adding any roll. Any required roll to bridge the pointing direction generated by joints 4 and 5 in the physical wrist to the full 3-axis body orientation of the link attached to joint 9 is supplied by physical joint 6.

Wrist Singularity Locating Maneuver.

The first step in planning the singularity avoidance maneuver places the wrist at its singular posture. Articulation of the compound wrist accomplishing this is illustrated by the singularity locating maneuver depicted in FIGS. 8 and 9. Table 1 describes the joints involved and matches them to the spherical triangle labels in FIG. 10.

Figure 8:
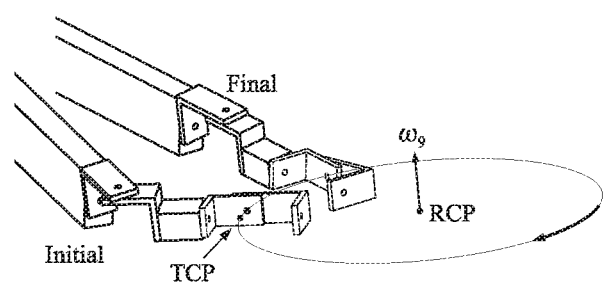
FIG. 8 shows a singularity locating maneuver in the coordinates of the robot base—the tool rotates clockwise about the axis tipped in the amount of the tool deflection marked by rotation center point RCP and rotation axis direction vector.

Placing the robot along a path passing nearby the singularity supplies a starting point for demonstrating this maneuver. FIG. 7 shows the robot at the wrist singularity. To allow a path-following algorithm[33] to move the robot away from the singularity to reach this location, robot wrist joints 4 and 6 are locked. Joint-axis direction vector $\omega_9$ is aligned with the x-axis and joint 9 is displaced by "tool deflection" 8 deg, forming a 7-joint closed kinematic loop with one degree-of-freedom (dof) that includes virtual joints 7 and 8. Axis direction $\omega_9$ is realigned with the z-axis, both it and the tool rotation plane are tipped 8 deg about an axis of rotation parallel to the x-axis, and joint 9 is displaced −40 deg. After unlocking joint 4 and locking joint 9, the tool deviation angle on joint 7 is declined to zero. The resulting 8-deg inclination of the axis of joint 9 seen in FIG. 8 gives the desired placement of the reference path.

Figure 9:
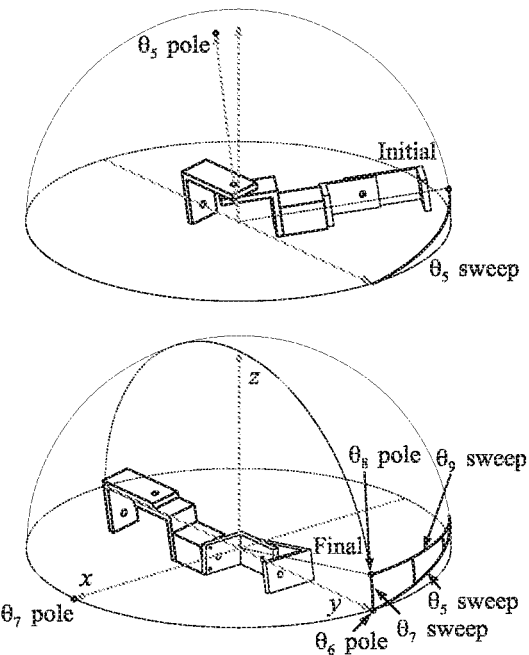
FIG. 9 shows a singularity locating maneuver in wrist-local coordinates.

From such a starting point, the locating maneuver brings the wrist to its singular position by declining the angle of joint 5 to zero. Departing the condition where the tool follows both its intended position and orientation with joint 1, 2, 3, 7, 8 and 9 held passive, this is done with joint 4 locked while employing the methods of Appendix A to guide joint 6 to maintain joint 7 at the minimum angle $\theta_7$ expressing the tool deviation in orientation. FIG. 8 depicts the wrist at the end of the robot arm. The initial and final postures of this maneuver are seen in relation to a coordinate frame referenced to the robot base. FIG. 9 switches to a local orientational frame referenced to the robot forearm, which reverses the apparent direction of the motion. The top drawing in FIG. 9 shows the sweep of pointing direction resulting from articulating joint 5 in the physical wrist; this is the singularity locating maneuver. The bottom shows sweeps of joint 7 in the virtual wrist with joints 4-6 held constant, which after each of three tracking steps are minimum displacements from the reference path passing near the singularity. Understanding how this procedure allows displacing the robot in close proximity to its singularity will be aided by the following visualization of wrist articulation and accompanying proofs in spherical geometry.

TABLE 1

Joint number and spherical triangle label-joints 1-3 are in the robot arm

| Joint description: | Joint number | Triangle label |
|---|---|---|
| Forearm roll | 4 | A |
| Wrist deflection | 5 | c |
| Second wrist roll | 6 | B |
| Tool deviation | 7 | a |
| Tool azimuth | 8 | C |
| Tool displacement | 9 | b |

Stereographic Projection of the Spherical Indicatrix.

The spherical indicatrix is a kinematic chain having joint axes in the same orientations as its parent spatial chain. These axes also intersect at a common point[38-40]. Closure of the indicatrix is hence a necessary condition for closure of that linkage. It is also useful for visualizing orientational displacements in a spatial linkage. The intersection of a revolute axis with the sphere surface—a rotation pole—is one representation of a joint in the plot of the indicatrix. A second representation sweeps a pointing direction along the rotation equator as the joint angle varies. The rotation pole and equatorial sweep for joint 5 (wrist deflection from the singular position) and joint 7 (tool deviation from orientation on the reference path) are seen in the top and bottom portions of FIG. 9, respectively.

When the joint poles are plotted as points on the sphere surface, connecting a pair of joints with a 90-deg link separates them by a 90-deg arc along a great circle. This means the equator of that second joint passes through the pole of the first joint, and the 90-deg connecting link is implied. A spherical dyad—links articulated by a pair of joints in series—is in this way represented by a great-circle arc for the second joint emanating from the pole for the first joint. The joint 6-7 dyad corresponds to the vertical arcs in the bottom drawing of FIG. 9; articulating joint 6 changes the direction of the arc swept by joint 7. These successive arcs depart from locations of the pole of joint 6 along the joint 5 sweep. Each such point is at the end of a path-following step that declines $\theta_5$. The last and longest of these arcs labeled "$\theta_7$ sweep" occurs at the end of the step reaching the singularity where $\theta_5$ is zero Snyder[41] gives formulas for alternative 2D projections of plots on the surface of a sphere as in FIG. 9. Of the projections to a tangent plane, the gnomonic projection draws rays from the center of the sphere through points on the sphere surface to that plane, mapping a hemisphere. Calling the closest point to the tangent plane the North Pole, the stereographic projection draws these rays from the South Pole. Mapping the entire sphere in this way places the South Pole at infinity. Note that what Ref. [8] calls the stereographic projection is properly the gnomonic projection by these definitions. The gnomonic projection plots all great circles as lines, but it doesn't preserve angles. The stereographic projection preserves angles, but only meridians through the poles are plotted as lines. Arcs on other great circles map to shallow curves.

Figure 10:
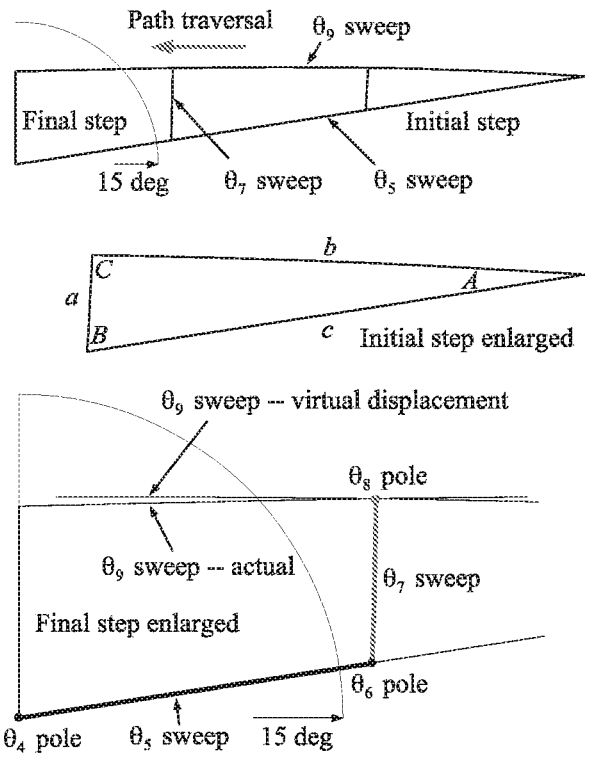
FIG. 10 shows a singularity locating maneuver from FIG. 9 in 2D stereographic projection.

FIG. 10 is inspired by prior use of a 2D map to gain insight into the articulation of a wrist near its singularity[30,31]. The stereographic projection is used in the current work to depict angles accurately. A minimum tool deviation will be represented by a joint sweep at a right angle to another sweep. Right spherical triangles will also establish how the singularity locating maneuver not only avoids a sudden onset of rapid joint rates but keeps those rates nearly constant.

The top plot in FIG. 10 shows the entire locating maneuver in relation to its accompanying reference path. Note how it unwraps the bottom plot in FIG. 9. The middle and bottom plots in FIG. 10 magnify the initial and final steps. The axis of joint 4 is coincident with the major forearm axis. Its pole is the North Pole in a stereographic projection. With the angle of joint 4 held constant in the locating maneuver, the sweep of joint 5 is along a meridian circle that indeed maps to a straight line. The sweeps of joint 7 showing deviations from the reference path are along non-meridian great circles, seen as shallow curves.

The sweep of joint 9 represents the reference tool orientational displacement from which the tool deviates. Treating the movable forearm as the initial link in a kinematic loop, the axis of joint 8 is connected through joint 9 back to the forearm through joints 1-3 of the robot arm. As the curve traced by the pole of joint 8 results from the actuation of multiple revolute joints, it is not on a great circle and shows a more pronounced curve. With joint 5 fixed and joint 6 allowed to vary, the sweep of joint 9 will trace a modified curve. As a consequence of the translational offsets between joints in a spatial kinematic chain, this curve depicting a virtual displacement differs slightly from the actual displacement where angle $\theta_5$ of joint 5 varies. The modified curve is at a right angle to the sweep of joint 7, meeting the geometric condition for a minimum angle of joint 7 at each location along the singularity locating maneuver.

Orienting the Tool Deviation Arc.

Minimum $\theta_7$ is therefore to be achieved and maintained everywhere along the singularity locating maneuver by setting and maintaining joint rate $C_{V7}=0$ in the virtual displacement where $\theta_5$ is held fixed. Such a virtual displacement occurs along a continuous set of points. These points are along the actual displacement path declining deflection angle $\theta_5$ to zero in the physical wrist. The guided virtual displacement method (Appendix A) conducts a power series expansion for the actual displacement path subject to the side condition $C_{V7}=0$, which is to be achieved and maintained along the actual displacement path.

In the limiting case of zero tool and task translational offsets, maintaining minimum $\theta_7$ establishes right spherical triangles for the steps along a displacement path. Dihedral angle A is constant for joint 4 locked. In this case where points WCP, TCP, and RCP from FIG. 7 are coincident, side b is the great-circle sweep of the programmed tool motion. Tool deviation a is at a minimum when azimuth C is fixed at 90 deg, and B is solvable from formulas for spherical right triangles[42]. For a reference path near the singularity where a stays small, and hence B varies by a small amount, the formulas confirm a, b, and c remain in nearly fixed proportions. Such modest variations in the joint rates allow large path steps, even when the singularity is close to the reference path or reference-path distance b is small.

Figure 11:
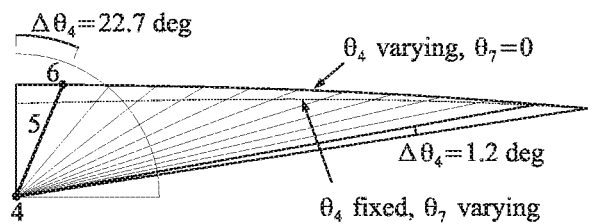
FIG. 11 shows a direct path to the wrist singularity where joint 4 (forearm rotation) varies and joint 7 (tool deviation) is fixed at zero and reproduces the dashed line from FIG. 10 where joint 4 is fixed and joint 7 varies.

This contrasts with the unmodified kinematic path in FIG. 11 used by Huang and Milenkovic to locate the singularity[30,31]. Note that the path traced by the pole of joint 6 departs a small amount from the comparison trace of joint 8 taken from FIG. 10. This is the consequence of links introducing translational offsets in the connection back to the forearm reference frame. A path-following kinematic solution suffers from the onset of large changes in $\theta_4$ for small steps in tool displacement $\theta_9$, which become extreme as the path distance to the singularity approaches but does not reach zero. The virtual wrist becomes singular when $\theta_7=0$, allowing a finite displacement of $\theta_6$ without changing $\theta_7$. Selecting an alternative virtual displacement at or near this singularity addresses this concern.

Theorem 4: For fixed angles $\theta_4$ and $\theta_5$ where $\omega_{6p} \neq \omega_8$, a zero virtual displacement of $\theta_7$ with respect to $\theta_{6p}$ implies $\theta_7$ is also stationary with respect to $\theta_6$. Angle $\theta_{6p}$ is the displacement of another (a $4^{th}$) virtual joint having its axis perpendicular to both joints 6 and 7 and intersecting the tool center point (TCP) as do the other joints in the virtual wrist. When $\omega_{6p} \approx \omega_8$, $\omega_6 \neq \omega_8$ allows reverting to joint 6 driving the virtual displacement.

Proof: With wrist joints 4 and 5 locked, applying loop closure to the joint screws $T_i=(\omega_i; v_{0i})$ expressing the instantaneous mobility from the joint-rate vector $C_{6:9C}$ gives $$\begin{bmatrix} \omega_6 & \omega_{6p} & \omega_7 & \omega_8 & \omega_{9C} \\ v_{06} & v_{06p} & v_{07} & v_{08} & v_{09C} \end{bmatrix} C_{6:9C} = 0 \tag{1}$$

Subscript$_{6:9C}$ denotes an inclusive range of indices. Vector $C_{9C}\omega_{9C}=C_9\omega_9+C_1\omega_1+C_2\omega_2+C_3\omega_3$ gives the combined angular velocity when actuating joint 9 for the tool rotation and joints 1, 2, and 3 for the robot arm. Placing the screw origin O instantaneously coincident with the tool center point (TCP) makes the velocity elements $v_{06:8}=0$. This requires joint rates satisfying the velocity closure relation $C_9v_9+C_1v_1+C_2v_2+C_3v_3=0$ making $v_{09C}=0$. Referring to FIG. 7 and expressing $\omega_6$, $\omega_{6p}$ and $\omega_8$ in relation to $\theta_7=[1\ 0\ 0]^T$, $$\begin{bmatrix} 0 & 0 & 1 & 0 & \omega_{9Cx} \\ c_7 & s_7 & 0 & 1 & \omega_{9Cy} \\ -s_7 & c_7 & 0 & 0 & \omega_{9Cz} \end{bmatrix} \begin{bmatrix} C_6 \\ C_{6p} \\ C_7 \\ C_8 \\ C_{9C} \end{bmatrix} = 0 \tag{2}$$

for $c_7 = \cos \theta_7$ and $s_7 = \sin \theta_7$. Driving an instantaneous displacement by either joint 6 or 6p requires $\omega_{9Cz} \neq 0$ to make $[\omega_7 \ \omega_8 \ \omega_{9C}]$ full rank. For $\omega_{6p} \neq \omega_8$, driving joint 6p then results in rate $C_{9C} \neq 0$; $\omega_{9Cx} = 0$ is then necessary and sufficient for $\theta_7$ to be stationary with respect to both $\theta_6$ and $\theta_{6p}$.

Just before the last tracking step, the virtual path traced by the pole of joint 8 in the bottom plot in FIG. 10 was generated by displacing joint 6p with 4 and 5 locked. Equation (2) establishes that displacing joint 6 instead would give an identical trace. The virtual path forms a right angle with the sweep of joint 7, is the required geometric condition for $\theta_7$ to be at its minimum.

At the start of the locating maneuver, $\theta_7 = 0$ gives $c_7 = 1$ and $s_7 = 0$. In this condition where $\theta_7 = 0$ for all values of $\theta_6$, finding $\theta_6$ giving zero virtual displacement of $\theta_7$ with respect to $\theta_{6p}$ will keep $\theta_6$ continuous after leaving the starting point. In place of conducting one or more path-following steps, solving Eq. (2) with $C_6 = 0$ and $C_{9C} = -1$ gives the joint rates $C_{6p} = \omega_{9Cz}$ and $C_7 = \omega_{9Cx}$. Designating $\omega_{9Cz} = gc_r$ and $\omega_{9Cx} = gs_r$ identifies a rotation by $\theta_r$ about joint 8 in the local z-x plane. Adding $\theta_r$ to $\theta_6$ and $-\theta_r$ to $\theta_8$ sets $\omega_{9Cz} = g$ and $\omega_{9Cx} = 0$ while leaving the other matrix elements in Eq. (2) unchanged. Having $\omega_{9Cx} = 0$ insures the tool deviation angle $\theta_7$ to be stationary with respect to both $\theta_{6p}$ and $\theta_6$ according to Theorem 4.

Because the joint rate solution is invariant from the coordinates expressing the joint screws, it is more convenient to solve AC=0 for $C_{4:6} = 0$ and $C_9 = -1$, where the columns of A are the complete set of joint screws in the coordinates of the robot base, and then calculate $$\theta_r = a \tan 2(C_7, C_{6p}) \quad (3)$$

using the 2-argument arctangent function a tan 2(y, x). This places the initial virtual displacement of joint 7 at zero, which is maintained or corrected in subsequent tracking steps.

Whereas the singularity locating maneuver depicted in FIGS. 8-10 applies to the robot with spherical wrist depicted in FIG. 7, the preceding description of the maneuver applies to robots with different relations of joints in the arm along with robots where all three wrist axis lines lack a common intersection point (an offset wrist) as employed in industrial practice.

Determining the Least-Maximum Deviation Along the Adjusted Path.

The goal is to locate where the least-maximum tool deviation occurs along the adjusted path, with least-maximum meaning the smallest value of peak deviation magnitude. Owing to a spherical wrist exhibiting self-motion by contra-rotation of joints 4 and 6 with all other joints unchanged at its singularity where $\theta_5 = 0$, the least-maximum will be seen to occur at the endpoint of the singularity locating maneuver. At this location with joints 1, 2, 3, 7, 8 and 9 passive, $\theta_7$ is already stationary with respect to $\theta_6$ and its non-singular counterpart $\theta_{6p}$.

Joints 4 and 6 are now contra-rotated to an initial position where joint axis directions $\omega_5 \perp \omega_7$ make $\omega_{6p} = \pm\omega_5$. Making use of the self-motion, this displacement is made by changing $\theta_4$ and $\theta_6$ by equal-and-opposite amounts to set $\theta_6 = 0$. From this starting point, a guided displacement with joints 1, 2, 3, 4, 5 and 7 passive is applied to joint 6; because of the self-motion allowed by joint 4 passive, this leaves the tool deviation angle $\theta_7$ and axis direction $\omega_7$ unchanged. Hence the stationary condition at the end of the locating maneuver is left unchanged. This guided displacement conducted by the method of Appendix A makes $\theta_7$ stationary with respect to $\theta_{6p}$.

Theorem 5: Under the preceding conditions, $\theta_7$ at path location $\theta_5 = 0$ is at a least-maximum.

Proof: At the end of the above guided displacement where $\theta_7$ is made stationary under a set of passive joints leaving $\theta_8$ and $\theta_9$ fixed, $\theta_7$ remains stationary with respect to a coordinated change in $\theta_4$, $\theta_5$ and $\theta_{6p}$ when joints 1, 2, 3, 7, 8 and 9 are made passive. For those passive joints, $\theta_7$ has remained stationary with respect to $\theta_6$ and also $\theta_{6p}$ at the end of the guided displacement. After a small guided displacement of $\theta_6$ keeping to $\omega_{6p}$ nearly collinear to $\omega_5$, the change in $\theta_5$ in the virtual displacement is non-zero. Owing to the self-motion at $\theta_5 = 0$, $\theta_7$ is also stationary with respect to equal-and-opposite change to $\theta_4$ and $\theta_6$. Linear combinations of coordinated changes in angles establish $\theta_7$ to be stationary with respect to $\theta_4$, $\theta_5$ and $\theta_6$. That $\theta_7$ is stationary with respect to $\theta_6$ is a necessary condition for maintaining minimum tool deviation $\theta_7$ along a kinematic path crossing through $\theta_5 = 0$. That $\theta_7$ is stationary with respect to $\theta_4$ and $\theta_5$ at $\theta_5 = 0$ is a necessary condition for this value of $\theta_7$ to be a maximum along all such paths crossing through $\theta_5 = 0$, making it a least maximum.□ With an offset wrist not satisfying the conditions of Theorem 5, finding the least-maximum point on the adjusted path requires guiding three virtual displacements according to Eq. (A14) to achieve stationarity of $\theta_7$ with respect to changes in each of $\theta_4$, $\theta_5$ and $\theta_6$.

Intercepting the Actual Path.

After locating the least-maximum point at angles ($\theta_{9ref}$, $\theta_{4ref}$), a through-the-singularity avoidance maneuver is planned by fixing the rate of a joint in the robot (such as $C_4$ of joint 4) in relation to the rate of tool traversal C applied to joint 9. From the zero reference for robot angles established by the posture in FIG. 7, the rate ratio is set to a negative value when least-maximum deviation $\theta_7 > 0$. Starting at ($\theta_{9ref}$, $\theta_{4ref}$), the adjusted path is followed for both forward and backward progression of angle $\theta_9$ until intercepting the tool displacement path achievable by the robot ("actual path") at points before and after singularity encounter. The pointwise optimal $\theta_6$ at ($\theta_{9ref}$, $\theta_{4ref}$) may be held fixed without affecting where $\theta_7 = 0$ is reached. Later when the singularity avoidance maneuver is carried out, however, joint 6 will be guided to achieve and maintain stationary $\theta_7$ along its entire path, starting where it diverges from the actual path. Such not only achieves the optimal deviation in tool orientation over the course of the avoidance maneuver, but it also guarantees that the path will pass through the least-maximum location.

Whereas any finite ratio may be used for this purpose with a spherical wrist, limiting it to $|C_4|/|C_9| = 6$ reliably gives before-and-after encounter intercept points for robots with offset wrists representative of industrial practice. Choosing a rate-ratio limit of 6 is also motivated by it limiting tool orientation deviation to about 10° inside the wrist"exclusion cone" ([43,44], Appendix B). Should a higher rate limit be allowed, reaching this limit by correcting the start and end points of the avoidance maneuver by displacements along the actual path allows for a shorter path interval for the avoidance maneuver where tool deviation takes place.

With joints 4 and 9 active, joint 6 held fixed and selecting joints 1, 2, 3, 5, 7 and 8 as passive, the path-following procedure of Appendix C solves for the zero of $\theta_7$ at the intercept point. This procedure is preferred on account of the initial zero slope of $\theta_7$ on this path being a singular condition in an alternative series-reversion solution as described in Appendix C.

Figure 12:
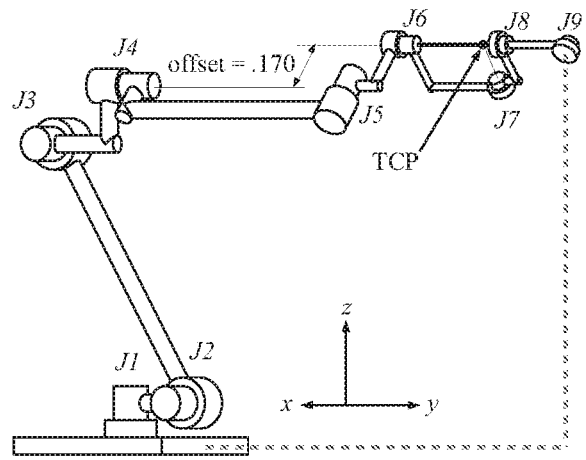
FIG. 12 shows a robot having an offset between joints 4 and 6 in the wrist along the axis of joint 5.

The intercept procedure is demonstrated for the robot in FIG. 12, where offsets may occur in different amounts between the axis lines of joints 1 and 2 arm along with joints 3 and 4 connected by links in the arm for the many robots in industrial practice, with or without an offset occurring between joints 4 and 6 in the wrist. Joints 7 and 8 extend the robot with a virtual wrist representing the allowed tool deviation whereas TCP denotes the center of the virtual wrist at the tool contact point with the work surface where accurate position is maintained. Articulation of virtual joint 9 represents the intended tool motion in relation to the base of the robot.

Figure 13:
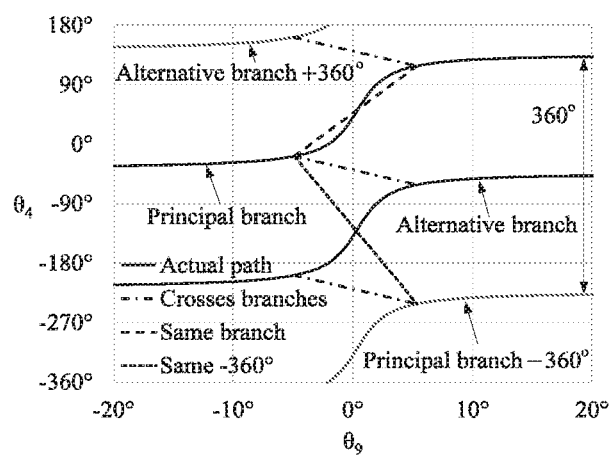
FIG. 13 shows a robot of FIG. 12 with zero wrist offset at 2° tool deflection.

FIG. 13 shows a plot for a spherical wrist having zero offset whereas FIG. 14 shows a plot shape that can only occur when the offset differs from zero. The displacement path of the robot is expressed by the angle on joint 4 of the robot (the initial joint in its physical, 3-axis wrist) as a function of tool traversal represented by the articulation of virtual joint 9. For convenience, the combined actual/virtual joint 6 that "steers" the tool deviation arc is locked when conducting a displacement on the actual path, and virtual joint angle $\theta_8$ gives the value of robot joint angle $\theta_6$ for the final joint in the physical, 3-axis wrist under conjugate virtual-wrist angles. "Tool deflection" gives proximity to the singularity, where FIGS. 8-10 were conducted at 8° by the procedure described earlier.

In FIG. 13, close approach to the singularity of a spherical wrist occurs at the steepest portion of the sigmoidal curve (flattened s-curve) of a selected branch of the displacement path. The slope of that curve gives the ratio of joint rates $\dot{\theta}_4/\dot{\theta}_9 = C_4/C_9$. A closer approach to the singularity produces a steeper, more abrupt sigmoidal curve expressing a higher peak rate ratio. At some amount of proximity, the rate ratio exceeds the capability of the robot, which is the problem addressed by the Preferred Embodiment. Were the rate limit to increase without bound, the sigmoidal curve would approach asymptotically an abrupt step function. Following the displacement path until the rate on joint 4 exceeds a prescribed limit may fail because of the abrupt onset of the steep portion of the curve—a procedure with this limitation was proposed by Aboaf and Paul[32] along with Huang and Milenkovic[30]. The Preferred Embodiment does not have this limitation.

Cheng et al.[1] calls the two alternative configurations of the wrist giving the same tool placement "no-flip" and "flip." For a spherical wrist, no-flip is changed into flip by a step change of equal and opposite rotations of 180° applied to joint 4 and physical joint 6 along with a change in sign of the angle of joint 5, with all other angles unchanged. Changing $\theta_4$ by 180° with an offset wrist results in changes of all the other angles, which may be solved by path following. Passing close by but not directly through the singularity maintains either no-flip or flip over a continuous, sigmoidal path on one branch of the path-following solution. No-flip and flip are called "principal branch" and "alternative branch" in FIG. 13. Because a 360° step applied to any joint leaves the robot posture unchanged, this pair of branches is replicated with each such rotation, resulting in an infinite number of branches, of which FIG. 13 shows portions of four.

The path-intercept procedure locates points before and after the inflection of two sigmoidal branches. "Crosses branches" connects the "before" with the "after" point from two branches, in the process passing directly through the wrist singularity where joints 4 and 6 become collinear. These starting and ending points are to be adjusted to connect the two branches with a path of limited joint rate and acceleration having least-maximum tool deviation over a least interval where tool deviation occurs.

"Same branch" joins before-and-after points without switching branches, also avoiding the steep, high-rate portion of the actual path. Because the path-intercept procedure finds points on different branches, this procedure is reapplied after changing branches by equal-and-opposite 180° rotation of joints 4 and 6. This step is of special importance for an offset wrist where the alternative branch is not exactly separated by an exact 180° change with all other joints unchanged as with a spherical wrist. The lines in FIGS. 13 and 14 connecting before-and-after points on the same branch that are found this way supply the initial condition when optimizing an around-the-singularity avoidance maneuver. One such line connects points on the principal branch whereas another line applies a reversed rotation of joint 4 connecting to the principal branch after subtracting 360° from $\theta_4$. The upward-sloping line results in a smaller excursion of $\theta_4$ in this instance. Whereas the alternative, downward-sloping line gives a larger excursion, this choice may be useful for untangling feed lines to the tool or avoiding other interferences in the robot or its workspace.

FIG. 14 shows a path reversal or turning-point type of singularity. Whereas an offset wrist can exhibit the sigmoidal path of FIG. 13, it can also show a path reversal over a finite range of proximity to the wrist singularity of the type demonstrated in FIG. 14. Under this condition, the actual path separates into two isolated segments before and after singularity encounter, Both the principal and alternative branch occur along each continuous path segment, with the switch between branches occurring at the notional singularity of the offset wrist where the axis lines of joints 4 and 6 become parallel. Owing to the coupling between arm and wrist, the robot may retain its full 6-axis mobility at this location, with the turning point or inflection on the actual path occurring nearby. Nevertheless, Cheng et al.[1] identify the change from no-flip to flip as requiring passage through this configuration.

FIGS. 13 and 14 also show the actual-path intercepts to occur at points on the actual path of both increasing slope and derivative of slope. For constant rate $C_9$ on the actual path, monitoring the signs of $C_4$ through its second derivative can detect a departure from this condition, upon which the rate-ratio limit may be reduced and the intercept procedure reapplied.

Connecting a path between before-and-after points that change branches will also cross through the notional singularity whereas an around-the-singularity path is planned by connecting points on the same branch. Starting from a point on the specified, principal branch, one of two same-branch paths is selected for having less excursion in $\theta_4$. This will give the least peak tool deviation $\theta_7$, apart from possibly where the $\theta_4$ excursion is nearly the same. In that instance, calculating both paths and select the path with lower $\theta_7$ may be required.

In this manner, points are located before and after singularity encounter on the same branch but different segments of the actual path. This is to be followed by corrections to these locations on their respective actual-path segments. These starting and ending points of the adjusted path along the avoidance maneuver bridge the exclusion zone to satisfy rate and acceleration limits. Such an avoidance path will increase tool deviation $\theta_7$ in magnitude until it reaches a peak at its slope inflection, decrease $\theta_7$ until reaching a point on the actual path where $\theta_7$ crosses through zero, have $\theta_7$ reach a peak of opposite sign and finally rejoin the actual path segment on the opposite side of the exclusion zone where $\theta_7$ once more reaches zero.

It is not known in advance, however, whether a crossing of the actual path midway on the line occurs between the two supplied points, or if it is one of these points. Whereas the downward-sloping "Same branch" line in FIG. 14 reaches the right hand path segment at $\theta_9$=6.24°, its endpoint is at its second intersection at $\theta_9$=6.70°, with each intersection marked in FIG. 14 with a diamond symbol. The "after" path point in this example happened to be at 6.70°, but were it at 6.24°, the line would need to be extended. This condition is detected by comparing the slope of the line against the slope of the actual path at their intersection. A midpoint is identified when the two slopes have the same sign and when the slope of the actual path is greater in magnitude. Subject to the connecting line having only one midpoint, if a path point is identified as a midpoint, the starting point is switched to the opposite path point. Using the procedure in Appendix C, a line of constant slope is traced to find the slope inflection, the zero crossing, the second slope inflection and then the final zero crossing of $\theta_7$, by this action locating the opposite endpoint.

Avoidance Maneuver Endpoint Correction to Limit Joint Acceleration

Both avoidance maneuver endpoints are displaced along the actual path to limit the joint acceleration $\dot{C}_4 = \ddot{\theta}_4$. The following applies to correcting the before-singularity point of the avoidance maneuver conducted for increasing tool angle $\theta_9$, with the correction for the after point following the same formulas after changing the sign of all acceleration values.

Consider a constant pair of angles ($\theta_{9ref}$, $\theta_{4ref}$) on the adjusted path and a pair of angles ($\theta_9$, $\theta_4$) at a location along the actual path at initiation of the avoidance maneuver. For all maneuvers, ($\theta_{9ref}$, $\theta_{4ref}$) is set to the a least-maximum point, which occurs at $\theta_5$=0 for a through-the-singularity maneuver of an offset wrist, only. An around-the-singularity path will have two least-maximum points, and the nearest is selected.

The angles on the actual path vary according to ($\theta_9(t)$, $\theta_4(t)$) when constant displacement rate $C_9$=−1 causes path distance $s=\theta_{9ref}-\theta_9(t)$ to increase at constant rate $\dot{s}=1$, Holding t fixed when following a path at rate $C_9$=−1 in the forward direction starting at $\theta_9(t)$ reaches after elapsed interval s. The actual change in $\theta_4$ over this interval is $\theta_{4ref}-\theta_4(t)$. The change in $\theta_4$ achieved at the acceleration limit applied over a forward path interval of length r obtained by integrating initial rate $C_{V4}(t)$ and constant joint 4 acceleration $a_4$ is $$\theta_{4limit,r}(t) = C_{V4}(t)r + \frac{a_4}{2}r^2 \qquad (4)$$

where $C_{V4}(t) = -C_4(t)$ from the reverse path varying $\theta_4(t)$. When the rate-ratio limit $C_{V4limit} = (C_4/C_9)_{limit}$ is reached at $0 < r = (C_{V4limit} - C_{V4}(t))/a_4 < s$, the remaining path of length s−r is traversed at rate $C_{V4limit}$ applied to joint 4 giving the total change in angle as $$\theta_{4limit}(t) = \theta_{4limit,r}(t) + C_{V4limit}(s-r) \qquad (5)$$
$$= C_{V4limit}s - \frac{1}{2a_4}(C_{V4limit}-C_{V4}(t))^2$$

The path-following procedure in parameter t generates power series coefficients for $C_{V4}(t) = -C_4(t)$, $\theta_4(t)$, $s=\theta_9(t)$ and in turn $\theta_4(t) = (\theta_{4ref}-\theta_4(t)-\theta_{4limit}(t)$ by way of the Cauchy product[45] applied to product terms in Eqs. (4) or (5) see Appendix A. The preferred procedure employs the method in Appendix C to solve for the zero of $\theta_{4err}(t)$, which establishes that the change in angle $\theta_{4ref}-\theta_4(t)$ is met at the active combination of acceleration and rate limits, giving the avoidance maneuver initiation point at ($\theta_9(t)$, $\theta_4(t)$).

Equation (4) is solved for $a_4$ at r=s and $\theta_{4limit,r}(t)=\theta_{ref}-\theta_4(t)$. If $a_4$ exceeds its limit, it is replaced by that limit and the avoidance maneuver endpoint correction is made using Eq. (4) evaluated at r=s. Should joint 4 exceed its rate limit at s when $a_4$ is subject to its limit, the correction is repeated using Eq. (5) for both the acceleration and rate limits being active.

if the calculated value of $a_4$ meeting $\theta_{4ref}-\theta_4(t)$ does not exceed either the acceleration or rate limits, no further correction is needed. Otherwise a level of acceleration may meet $\theta_{4ref}-\theta_4(t)$ at the active rate limit without correcting ($\theta_9$, $\theta_4$). Applying $a_4r=C_{V4limit}-C_{V4}$ to Eq. (5) gives $$a_{4no\ correct} = \frac{(C_{V4limit}-C_{V4}(t))^2}{2(C_{V4limit}s-(\theta_{4ref}-\theta_4(t)))} \qquad (6)$$

If either of the conditions $C_{V4limit}s-\theta_{4limit}\neq 0$, $a_{4no\ correct}$ within the acceleration limit and $0 < r = (C_{V4limit}-C_{V4}/a_4) < s$ is not satisfied, $a_4$ is replaced by its limit and the avoidance maneuver endpoint correction is made using Eq. (4) evaluated at r=s. When $s=\theta_{9ref}-\theta_9(t)<0$, the substitution $a_4 \leftarrow -a_4$ supplies the change in sign for Eqs. (4) and (5), $a_{4no\ correct} \leftarrow -a_{4no\ correct}$ for Eq. (6).

For a through-the-singularity maneuver, the before-and-after-singularity halves meet at ($\theta_{9ref}$, $\theta_{4ref}$) with largest tool deviation $\theta_7$. To achieve continuity of joint rates, the peak rate of joint 4 applying the acceleration limit to the "before" half supplies the rate limit for this procedure applied to the "after" half. If "after" reduces the rate limit further, the adjustment of "before" is repeated. If the before and after rates still disagree, neither rate limit is active. Adjustments are then made to the constant accelerations applied to before and after.

Figure 16:
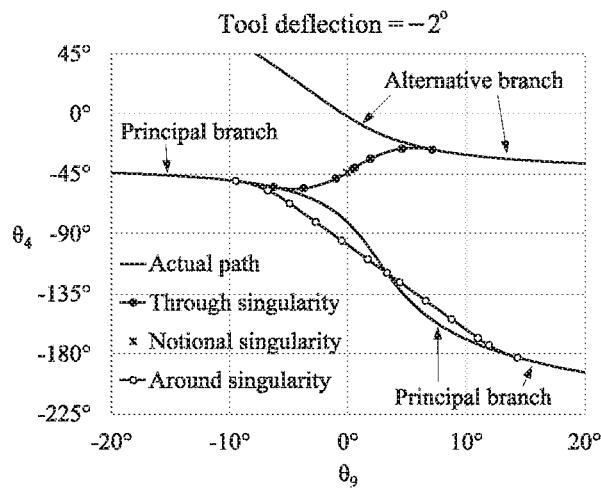
FIG. 16 shows the robot of FIG. 12 at −2° tool deflection, where both branches of the actual path pass through the region of singularity encounter.
Figure 17:
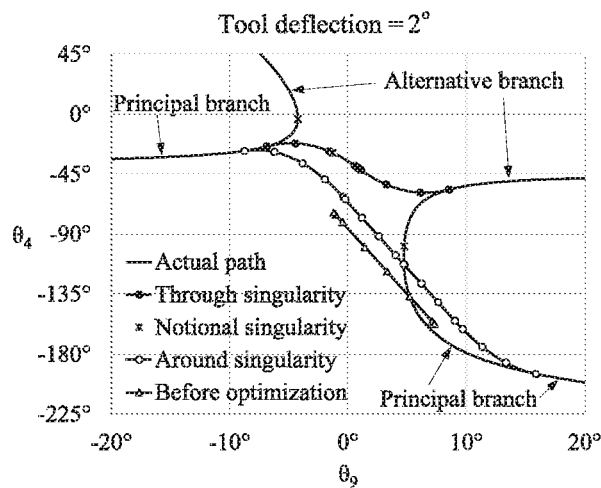
FIG. 17 shows the robot of FIG. 12 at 2° tool deflection, where the actual path has two isolated path-reversal segments near singularity encounter.

For an around-the-singularity maneuver, too low an acceleration limit may result in reaching the rate limit after the nearest least-maximum point ($\theta_{9ref}$, $\theta_{4ref}$). As this violates the assumptions in the optimization for that point, the acceleration limit is increased so the rate limit is reached at that point. The procedure correcting the endpoint is rerun using Eq. (4) with r=s and $a_4=(C_{V4limit}-C_{V4}(t))/s$. Increasing the acceleration limit in this way generates an avoidance maneuver with a smooth onset of maximum slope as seen in FIGS. 16 and 17.

For the robot in FIG. 12, FIG. 15a shows the outcome of correcting the avoidance maneuver endpoints; with $C_9$=1, rate $|C_4|$ is limited to 6 rad/s (the condition in Appendix B) and acceleration $|\dot{C}_4|$ to 50 rad/s². The series expansions of Appendix A are carried out over index k<p=10. The plotted sweeps of joint 7 give the tool deviation arc at the end of each path-following step, with the smooth path curves calculated from series coefficients.

The Actual path of tool displacement generated by the robot splits into the Reference path of the intended tool orientation and the Avoidance path, where the tool orientation differs in the amount of the tool deviation. Owing to wrist offsets inducing orientational changes in the arm to be corrected by articulating these wrists, the reference path on the stereographic plot showing orientation will differ from the actual path owing to articulation of the virtual wrist producing the plotted tool deviation arcs. This coupling results from the separation between the virtual and physical wrists along with any offset in the physical wrist. Furthermore, an actual path producing the same tool orientations as the reference path does not exist for an offset wrist under the conditions of FIG. 14, where FIG. 15b shows the desirable property of the avoidance path crossing the zone from which the actual path is excluded.

The dots in FIGS. 15a and 15b mark where the through-the-singularity maneuver changes branches by passing through $\theta_5=0$. The effect of ending the avoidance maneuver on different branches is pronounced for the offset wrist in FIG. 15b. Changing branches on the actual path produces no visible change to FIG. 15a owing to how the robot preserves angles after a 180° "flip" of a spherical wrist. The differences in the around-the-singularity paths between FIGS. 15a and 15b result from choosing the lines with least excursion in $\theta_4$ to connect points before and after singularity encounter on the same branch in FIGS. 13 and 14.

The least-maximum deviation occurs at the dot along the avoidance path adjusted to pass through-the-singularity of a spherical wrist, occurring near but not at the dot for the offset wrist. The amount of deviation does not change with an increased rate limit. The least-maximum deviation for the around-the-singularity path occurs in two places as the tool deviation advances, retreats, crosses zero, and then advances, retreats and reaches zero the end of the avoidance maneuver. The global least-maximum deviation is achieved by equalizing the local least-maximum deviation at its two locations by Eqs. (A15)-(A19) in Appendix A. Increasing the rate limit, however, will reduce this global least-maximum, with an offset wrist having a maximum rate limit owing to the gap between segments of the actual path seen in FIG. 14.

FIG. 16 shows a tool deflection where the offset wrist produces sigmoidal actual-path branches similar to a spherical wrist whereas FIG. 17 shows path reversals for a turning-point singularity that are unique to an offset wrist. The need to account for such path reversals was also not contemplated by prior art considering an offset wrist[1,30]. The rate limit for the around-the-singularity path (10.2 for FIG. 16, 9.8 for FIG. 17) along with the acceleration limit for both paths (66.7 rad/s) are modified from before for plot visualization, with the around path increasing this acceleration slightly to achieve the rate limit at its least-maximum points.

In FIG. 16, the location of the notional singularity marked on the through-singularity avoidance path connecting two actual-path branches. This is the only path segment crossing through $\theta_5=0$ at this location where it changes branches. In contrast, the around-singularity avoidance path connects two points on the same sigmoidal branch. The anticipatory behavior of this alternative mode of singularity avoidance[31] is seen in this plot, where the rate of joint 4 initially increases in relation to the actual path subsequent to its departure from the actual path but lags in rate when the actual-path curve reaches peak slope.

In FIG. 17, the notional singularity where branch switching takes place is marked on each isolated path-reversal actual-path segment as well as on the through-singularity path bridging points on isolated path segments on different branches. As before, the around-singularity path connecting points on the same branch does not cross the notional singularity, even though these points are on isolated segments.

FIG. 17 also shows the "before optimization" line segment joining points of peak tool deviation. The optimization procedure of Appendix A displaces these points to equalize their local least-maximum tool deviation, placing them along the globally optimum around-singularity path. Owing to the proximity of the line through these points to the turning point on the left-hand actual-path segment, the algorithm conducted the optimization with two displacement steps. Applying an acceleration limit adjusted the initiation and termination points of the resulting avoidance maneuver, resulting in the smooth transitions between the actual path segments and the around-singularity path line of constant slope.

Figure 18:
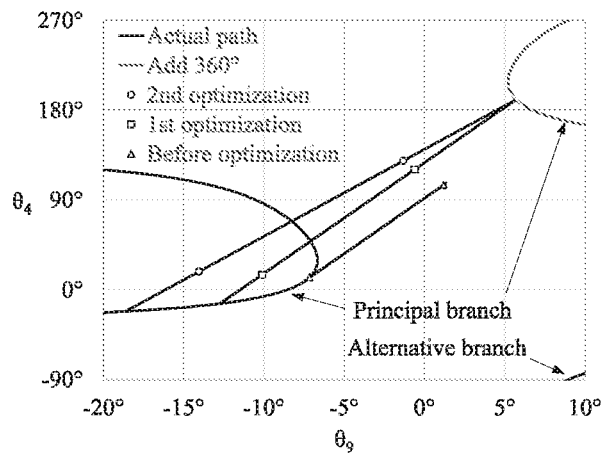
FIG. 18 shows the robot of FIG. 12 at 6.207° tool deflection showing second path optimization after the first optimization reaches its limit.

FIG. 18 shows where shifting the line at constant slope is unable to equalize the two local least-maximum deviations before reaching a limit position in relation to a turning point. The second optimization (Eqs. (A21)-(A25) of Appendix A) holds fixed the line intersection with the actual path on that segment while reducing the slope to reach the global optimum of equalized least-maximum deviations. The preferred procedure conducts the second optimization in two displacement steps, where the first step omitted the correction to the virtual displacement of Eq. (A25) accounting for the varying slope to obtain improved series convergence.

Figure 19:
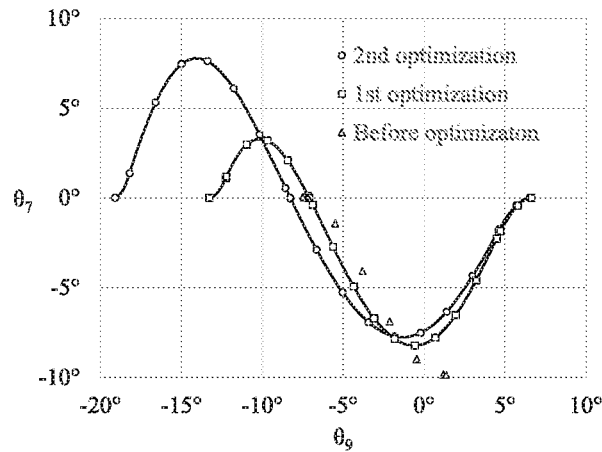
FIG. 19 shows the robot of FIG. 12 at 6.207° tool deflection showing tool deviation 9, varying with tool traversal $\theta_9$.

FIG. 19 shows the pattern of alternating maximally positive and then negative tool deviation occurring along the around-the-singularity line segment connecting points on the actual path shown in FIG. 18. The second optimization reaching the global least-maximum tool deviation, reducing one excursion a small amount while greatly increasing the second excursion to match it. It also significantly increased the tool traversal interval over which tool deviation takes place. Whereas the benefit of the fixed-endpoint varying-slope optimization is mixed, it is included both for completeness in applying least-maximum optimality as well as demonstrating the generality of the guided-displacement procedures of Appendix A.

Path-Following Step-Size Limits.

Path-following displacements steps conducted by a high-order series expansion such as but not limited to Eqs. (A4)-(A6) are to be limited in length to obtain high accuracy, which is quantified by the level of closure error in the kinematic loop incorporating the robot. The resulting orientational mismatch is represented by a 3×3 rotation matrix R and a 3-element translational displacement vector d using well-known rules for combining these transformation in a serial kinematic chain. These representations, in turn, are transformed into a pair of 3-element vectors $(\theta\omega, \theta v)$[46] representing the closure error by a screw motion through angle $\theta$ about the fixed screw axis line represented by $(\omega, v)$. A corrector for the path-following closure error, either as a separate step or combined with the next predictor step, is readily implemented by supplying this representation of a virtual joint with rate $\theta/t_h$ to Eq. (A5).

For purposes of setting the step size $t_h$ of the path-following predictor step, this screw representation also quantifies the closure error by a distance $\|\theta v\|$ and an angle $\|\theta\omega\|=|\theta|, \|\omega\|-1$. The accuracy of a truncated Taylor-series expansion depends on distance to the nearest singularity. For a spherical wrist, $\theta_4$ of the singularity close-approach on an adjusted path where $\downarrow_5=0$ and the value of $\theta_6$ gives least tool deviation $\theta_7$, which is the same value at its $(\theta_{9ref}, \theta_{4ref})$ least-maximum point, supplies a reference point for limiting the step size in the Preferred Embodiment to $\pm 0.3|\theta_{9ref}-\theta_9|$ for an order p=10 series expansion when $\theta_9$ is the start of the step.

Owing to an inflection or turning point $\theta_{9sing}$ on the actual path occurring way from $\theta_{9ref}$ in the case of an offset wrist, the actual-path step is instead limited to $\pm 0.3|\theta_{9sing}-\theta_9|$ Holding joint 6 fixed and selecting passive joints 1, 2, 3, 5, 8 and 9, joint 4 replaces joint 9 in path-following displacement steps along the actual path. The least-maximum point ($\theta_{9ref}$, $\theta_{4ref}$) supplies the limit $\pm 0.3|\theta_{4ref} - \theta_r|$ for those steps employing the procedure of Appendix C to locate where for constant rate $C_4$, rate $C_9$ crosses zero, identifying a turning point, or joint acceleration $\dot{C}_9$, crosses zero, where the identified point supplies $\theta_{9sing}$.

The procedure for planning a through-the-singularity avoidance maneuver locates ($\theta_{9ref}$, $\theta_{4ref}$) near the Principal branch in FIGS. 13 and 14 and also ($\theta_{9ref}$, $\theta_{4ref}$ remote from it near the Alternative branch. The limit for path-following steps in the search for $\theta_{9sing}$ uses the lesser amount of $0.3|\theta_{4ref} - \theta_4|$ and $0.3|\theta_{4alt\ ref} - \theta_4|$.

Figure 20:
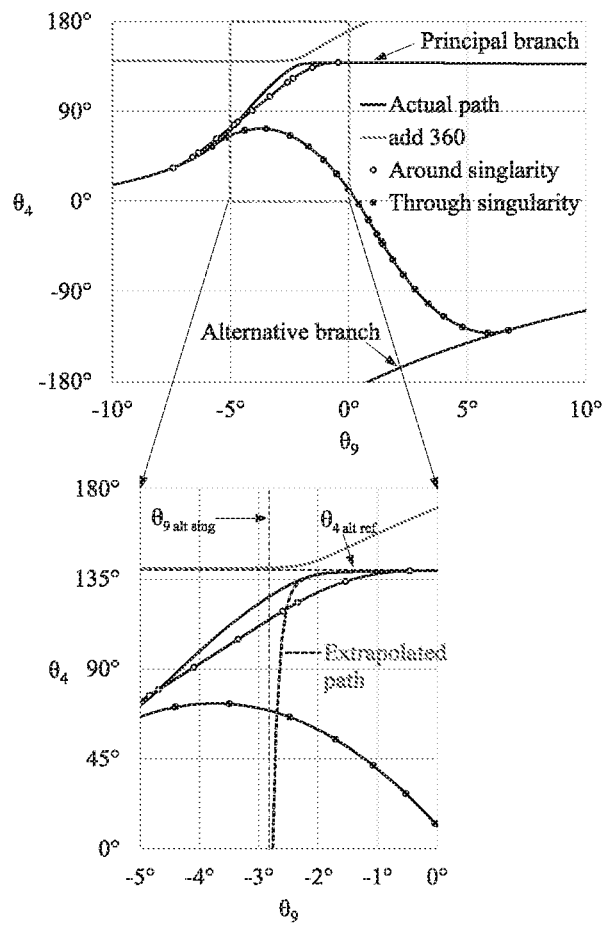
FIG. 20 shows the robot of FIG. 12 at 12.28° tool deflection, acceleration limit 500 rad/s$^2$, where two through branches of the actual path exhibit a bifurcation away from the inflection on the principal branch.

FIG. 20 shows that for an offset wrist, the actual path can have "sharp corner" away from its point of peak slope, also not addressed by prior art[1,30]. This curvature inflection is associated with a close approximation to the bifurcation between through and path-reversal of a pair of path branches at ($\theta_{9alt\ ref}$, $\theta_{4alt\ ref}$) as seen in FIG. 20.

On the actual path with joint 9 active, and starting at the after-encounter intersection of the remote through-the-singularity line, the upward sloping "extrapolated path" is generated by setting all negative-valued terms beyond $2^{nd}$ order to zero in a displacement step taken in the $-\theta_4$ direction. This action biases the series to diverge downward when approaching its radius-of-convergence bounded by a singularity. Angle $\theta_{9alt\ sing}$ marks where the excursion of the extrapolated path has crossed $-180°$. If this location is beyond the point of maximum slope of the principal branch as seen in FIG. 20, the path-following steps on the actual path past this location are limited to $\pm 0.3|\theta_{9alt\ sing} - \theta_9|$.

Steps are conducted at a constant rate along an adjusted path in proximity to the singularity, whether in planning or executing the singularity avoidance maneuver. These planning steps are limited to 20° for the highest rate active joint, such as in the Preferred Embodiment where rates $C_4$ and $C_9$ are in a constant ratio where $|C_4/C_9|>1$. These steps may be further limited in length by the procedure in Appendix C. Steps in avoidance execution where additional limits are not applied are limited to 14°. The resulting closure error for robots representative of industrial practice in FIGS. 12 and 21, with and without wrist offset and over range of proximity to the singularity requiring path adjustment to meet rate limit $|C_4/C_9|=6$, are of order of $10^{-6}$ m distance and $50(10^{-6})°$ angle, where "of order" is an upward-rounded geometric mean of the worst-case values for each of two robots over two wrist conditions.

The following supplies a step limit at constant acceleration in avoidance execution. The sine and cosine functions of displacement generated by joint rotation have an infinite radius of series convergence, but 1 rad (57.3°) is its effective value where convergence become impractically slow. A maximum allowed step s is calculated for either direction that changes $\theta_4$ by $\pm 1$ rad. This is expressed as the solution to $\dot{C}_4 s^2/2 + C_4 s \pm 1 = 0$ at acceleration $a=\dot{C}_4$ and rate $v=C_4$. For $\alpha=|C_4/\dot{C}_4|$, $g=|2/\dot{C}_4|$, the smallest positive-valued step length meeting these conditions is $$s_1 = |-\alpha + \sqrt{\alpha^2 + g}|, \quad (7)$$

if $\alpha^2 < g$, $s = s_1$ otherwise, $s = \min(s_1, |-\alpha + \sqrt{\alpha^2 - g}|)$ Limiting the step length $\pm 0.3$ s keeps closure error at constant active-joint acceleration keeps error within the limits occurring for constant rate.

Increasing the constant-rate avoidance execution step size to 20° increases the closure error to order 50 $(10^{-6})$ (0.05 mm) distance and 2000 $(10^{-6})°$ angle (2 thousandths of a degree). This is consistent with the 50-fold change— $(0.7)^{p+1}=50.6$—expected for an order p=10 Taylor series approximation of a function within its region-of-convergence not including any singularities.

Choosing Between the Through and Around-Singularity Adjusted Path.

TABLE 2

Figure 21:
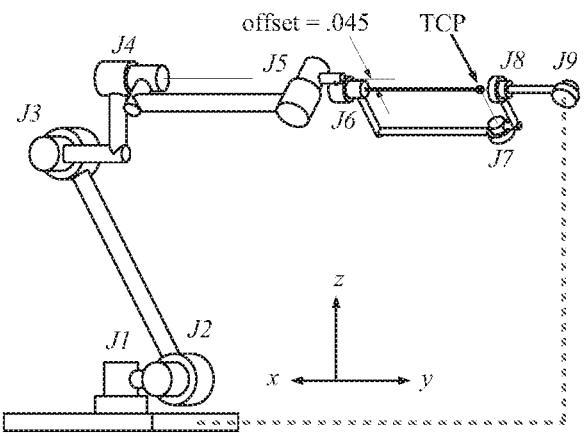
FIG. 21 shows the robot with an alternative wrist offset where the axis of joint 6 is offset from the axis of joint 4 in a direction perpendicular to the axis of joint 5.

Worst-case least-maximum tool deviation over the range of proximity to the singularity requiring path adjustment to meet rate limit $|C_4/C_9| = 6$ for the robots from FIG. 21 and FIG. 12 having different directions of the wrist offset

| | Offset (m) | Rate limit $|C_4/C_9|$ | Tool deviation angle (°) | | |
|---|---|---|---|---|---|
| | | | Through singularity | Around singularity | Best method |
| FIG. 21 | −0.045 | varying | 10.057 | 0.665 | 0.665 |
| | | 6 | 10.057 | 6.570 | 3.382 |
| | 0 | 6 | 9.821 | 6.486 | 3.327 |
| FIG. 12 | 0.170 | varying | 19.615 | 7.766 | 7.516 |
| | | 6 | 19.615 | 9.132 | 7,516 |
| | 0 | 6 | 9.919 | 6.550 | 3.290 |

The robot in FIG. 21 with different amounts of arm and wrist offset along with the wrist offset in a direction perpendicular of the axis of joint 5 is compared with the robot from FIG. 12. Table 2 addresses whether the through-singularity, around-singularity or a selection between methods gives the least excursion in the tool deviation and in what amount. "Best method" selects between the through and around-singularity methods at each tool deviation value over the range considered. Setting both robots to zero offset gives similar results, with around singularity giving about $\tfrac{2}{3}$'s the deviation as through singularity, and choosing the best method giving $\tfrac{1}{3}$ the deviation. This pattern is maintained for the robot of FIG. 21 with non-zero wrist offset at the same rate-ratio limit of 6.

TABLE 3

Timing for singularity-avoidance planning and execution

| | Rate limit $|C_4/C_9|$ | Time (ms) | Locate | Optimize | Adjust | Total planning | Execute |
|---|---|---|---|---|---|---|---|
| Through singularity | varying | Avg | | | | 0.552 | 0.431 |
| Around singularity | varying | Avg | 0.040 | 0.227 | 0.727 | 0.994 | 0.422 |
| | | Max | | | | 1.149 | 0.590 |
| | 6 | Avg | 0.040 | 0.212 | 0.702 | 0.954 | 0.292 |
| | | Max | | | | 1.093 | 0.338 |

Table 3 presents average and worst-case timings (Intel Core i5 2.5 GHz processor, single-core mode, 64-bit Java OpenJDK 10 and Windows 10 software environments) across the same conditions. The total time for planning the around-singularity path is separated into "Locate" to find the close approach in tool deviation from the notional singularity to intended tool position, "Optimize" to find the least-maximum point for the proximate and remote through-singularity paths along with the optimal around-singularity line, with "Adjust" including searches for the inflection or turning points on the actual path as required for an offset wrist along with displacements along the actual path to meet the rate and acceleration limits. "Adjust" is substantially reduced for a spherical wrist not requiring such path steps locating singularities on the actual path.

The calculation time in planning the around-singularity path is about, twice that of the through-singularity path, with little change at the reduced rate limit. This is anticipated to be the total time using parallel processing when planning both maneuvers to allow selecting between the two. The reduced planning time for the through-singularity maneuver could be conducted on a second processor core, conducted independently of the "Adjust path" operations for around singularity and fitting within that time allotment. Hence planning the singularity maneuver of least deviation is expected to take about 1 ms, with path execution taking about half that time when conducted with either one or the other maneuver.

Appendix A—Optimization Procedures.

A robot is extended with a virtual wrist, which in turn is followed by a final virtual joint representing the intended tool motion in reference to the robot base. The resulting kinematic model expressed by a 9-joint closed kinematic loop (joint 6 represents the last joint in the physical wrist combined with the first in the virtual wrist supplies kinematic redundancy to allow limiting joint rate and acceleration along an adjusted displacement path near singularity encounter. This reduces to a 7-joint loop for displacements on the actual path where the tool deviation angle is held at $\theta_7=0$ before and after singularity encounter. Applying a high-order path-following method[33,47,48] to this loop solves the robot inverse kinematics problem (IKP) over a continuous path of the intended tool displacement. Extending this method to controlling redundant joints in the 9-joint loop will do the same when near the singularity.

Keeping the same numbering scheme as prior work[33,48,49], joint 1 connects link 1 of the robot base to the initial moving link 2 in the robot. A revolute joint has screw $T_j=(\omega_j; v_{\theta j}=r_j \times \omega_j)$ constructed from a pair of 3-element vectors: unit-length $\omega_j$ gives the joint axis direction, $r_j$ selects a point on the joint axis line and × denotes the vector cross product[50,51]. From a set of joint angles at the start of a path-following step, solving the robot forward kinematics problem (FKP) determines initial joint axis directions $\omega_j$ and joint axis-line reference points $r_j$.

The combined translational and orientational motion of each link in the kinematic chain is represented by its instantaneous screw or twist $T_{Ci}$ by the well-known relationship $$T_{Ci} = \sum_{j=1}^{i-1} C_j T_j \qquad (A1)$$

where $C_j = \dot{\theta}_j$ is the rate of joint j having joint screw $T_j$ and angle $\theta_j$. The joint screws in this formula are expressed in a common coordinate frame referenced to the robot base. In the case of a non-redundant robot where the joints are numbered 1 through n=6 and the last loop joint representing tool motion in joint n+1=7, rate $C_{n+1}$ is prescribed. The remote connection of the link back to the robot base fixes $$T_{Cn+1}=0 \qquad (A2)$$

At any robot posture where the 6 robot joint screws $T_1, \ldots, T_6$ are linearly independent, applying this form of the loop closure constraint along with a specified t traversal rate $C_7$ to Eq. (A1) allows solving for joint rates $C_1, \ldots, C_6$ expressing the instantaneous mobility of the closed chain incorporating the robot.

In considering a finite displacement of this chain, the axis lines of the joints are conveyed through space by the links to which they are attached. Apart from the fixed axis lines of the joints connected to the robot base at each end of a chain, the resulting variation in the joint screws has the differential equation $$\dot{T}_i = T_{Ci} \times T_i \qquad (A3)$$

where $T_{Ci}$ is selected to be the instantaneous screw imparted on the link immediately preceding the joint in the designated numbering scheme with Lie product x (boldface x).

Loop-closure constraint Eq. (A2) applied to the coupled Eqs. (A1) and (A3) allows solving for both the time varying joint screws $T_i(t)$ along with joint rates $C_i(t)$. For a robot made redundant by adding virtual joints, a solution is found by designating a non-redundant subset of coefficients $C_i$ as passive joint rates whereas the remaining coefficients are designated as independent variables controlling the active joints. Setting one or more of these independent variables to zero locks those joints. Term-by-term integration of high-order power-series expansions of the rates $C_i(t)$ gives the robot joint angles $\theta_i(t_h)$ at the end of a path-following step of length $t_h$. The robot base-referenced screw-based power series expansion of Eqs. (A1)-(A2) originally disclosed[49], compared[33] to a matrix-based method[52] and alternatively expressed in moving link-local coordinate frames[48], is expressed next.

The variables varying with time have series expansions $$T_j = T_j(t) = T_j[0] + T_j[1]t + T_j[2]t^2 + \ldots,$$

$$C_j = C_j(t) = C_j[0] + C_j[1]t + C_j[2]t^2 + \ldots,$$

$$T_{Ci} = T_{Ci}(t) = T_{Ci}[0] + T_{Ci}[1]t + T_{Ci}[2]t^2 + \ldots,$$

Eq. (A1) relates the series coefficients of these variables by $$T_{Ci}[k] = \sum_{j=1}^{i-1} C_j[k]T_j + T_{BCi}[k] \qquad (A4)$$

$$T_{BCi}[k] = \sum_{j=1}^{i-1} \sum_{m=0}^{k} \tilde{C}_{j[m]} T_j[k-m] = \sum_{j=1}^{i-1} \tilde{C}_j[k] * T_j[k]$$

where initial joint screws $T_j = T_j[0] = T_j(0)$ and $\tilde{C}_j[m] = C_j[m]$ apart from $\tilde{C}_j[k]=0$. Operator * denotes discrete convolution expressed by the inner summation, which is also the Cauchy Product combining the series expansions of the product of two functions[45]. For link i=n+1 closing the chain, the loop closure constraint $T_{Cn+1}(t)=0$ is expressed $$T_{Cn+1}[k] = AC[k] + T_{BCn+1}[k] = 0 \qquad (A5)$$

where the columns of matrix A are constructed from the initial joint screws $T_i$. Solving for rate vector C[k] of elements $C_j[k]$ subsequently allows updating $T_{Ci}[k]$ from $T_{BCi}[k]$ in Eq. (A4). When loop closure error accumulates at the end of a path-following step, $T_{BCn+1}[0]$ calculated by the method of Ref.[46] is applied to the next step in a combined predictor-corrector procedure[36,37,48].

Equation (A3) tracks the joint screws over a finite displacement giving $$T_i[k+1] = \frac{1}{k+1} \dot{T}[k] = \frac{1}{k+1} T_{Ci}[k] *_\times T_i[k] \qquad (A6)$$

Operator $*_x$ denotes discrete convolution over the Lie product x.

Note that the link instantaneous screws depend on the joint screws in Eq. (A1) whereas the joint screws in Eq. (A3) depend on the link screws. This cycle of dependence is broken in the series expansion by the current coefficients $T_{BCi}[k]$, $C[k]$ and $T_{Ci}[k]$ depending only on the joint screw coefficients up to $T_i[k]$, with the next coefficient $T_i[k+1]$ calculated in Eq. (A6) from the link screw and joint screw coefficients up to $T_{Ci}[k]$ and $T_i[k]$. This relationship follows from the series coefficients $T_i[k+1]$ being calculated from the term-by-term integration of the series representation of $\dot{T}_i(t)$.

A second useful relationship is the manner in which a non-linear implicit function has its series expansion calculated by the order-recursive solution of not simply a linear system of equations, but one having a constant matrix of its homogeneous form as seen in Eq. (A5). This allows from the closure constraint of Eq. (A2) applied not just instantaneously but over the course of a finite displacement. Such is represented by the time-varying linear system $A(t)C(t)=0$ having series coefficients that separate according to $$A[k] * C[k] = A[0]C[k] + \sum_{m=0}^{k-1} A[m]C[k-m] = AC[k] + T_{BCn+1}[k]$$

where constant matrix $A=A[0]=[T_1[0] \ldots T_{n+1}[0]]$. Owing to how the Cauchy product expresses the series coefficients of $A(t)C(t)$, the contribution of the current series coefficient $C[k]$ is hence the homogeneous linear term $AC[k]$, which is separated from $T_{BCn+1}[k]$ bundling the contributions from prior coefficients $C[0], \ldots C[k-1]$. Each $C[k]$ is therefore the solution to the linear system $AC=B$ supplied the "right-hand side" $B=-T_{BCn+1}[k]$.

Algorithm 1: Specify joint screws $T_i(t=0)=T_i[0]=T_i$ at the initial posture. For each index k starting at zero, 1) compute $T_{BCn+1}[k]$ by Eq. (A4), 2) supply that value to the linear system of equations with constant homogenous coefficient matrix A in Eq. (A5) to solve for the joint-rate coefficient vector $C[k]$, 3) substitute the scalar elements $C_i[k]$ of vector $C[k]$ back into Eq. (A4) to determine instantaneous link screws $T_{Ci}[k]$ and 4) supply those screws to Eq. (A6) calculating the joint-screw coefficients $T_i[k+1]$ needed for the next value of index k.

The preceding constitutes an algorithmic differentiation, where a process determining high-order derivatives of an analytic function by recursive application of formulas giving such a power series expansion is one of the established techniques[53]. Unlike the fitting of interpolating polynomials that gives approximate derivative values and requires function evaluations at multiple points, algorithmic differentiation calculates numeric values of exact derivatives at a single point, to within precision of a computer floating-point representation. The single summations of order k terms for each successive series index k are advantageous over alternative formulas for calculating derivatives, whether the Faa di Bruno formula[54] or recursive derivation of symbolic relationships[55,56], both of which grow geometrically.

How the cycle-of-dependence of the time-dependent equations is broken in the series expansion, and that the influence of each successive coefficient is a separable constant-matrix linear term, is foundational to how this algorithm is next extended to a kinematic loop having multiple degrees-of-freedom requiring additional constraints.

Additional Degrees-of-Freedom

The guided displacement method supplies additional independent variables to Eq. (A5) as arising in a path-following procedure applied to a robot with redundant degrees of freedom by $$C[k]=C_\gamma \gamma[k]+C_\beta[k] \tag{A7}$$

where $C_\gamma$ is constant and $\gamma[k]$ is the guiding coefficient, a scalar for single guiding, a column vector for multiple guiding, where Greek letter γ (gamma) denotes "guiding" and β (beta) "baseline." This separates the guiding term $C_\gamma \gamma[k]$ at index k from the contribution of all other terms in $C_\beta[k]$.

The n×v matrix $C_\gamma=[C_{\gamma i,r}]$ for joints $1 \le i \le n$. The guiding coefficients for $1 \le r \ge v$ form column vector $\gamma[k]=[\gamma_1[k] \ldots \gamma_v[k]]^T$. Hence product $C_\gamma \gamma[k]$ remains a column vector under single guiding where v=1 or multiple guiding with v>1. Upon substituting $C[k]$ from Eq. (A7), Eq. (A5) is satisfied for all $\gamma[k]$ when $$AC_\gamma=0, AC_\beta[k]+T_{BCn+1}[k]=0 \tag{A8}$$

Whereas this separation of terms is not unique, Eq. (A8) placing the $T_{BCn+1}[k]$ term in the second of the two formulas simplifies deferring the calculation of $\gamma[k]$ until applying additional constraints. The one or more columns of $C_\gamma$, constituting homogeneous solutions to a linear system with the same matrix A as Eq. (A5), are calculated once at the start of a series expansion. Subsequently at each index k, scalar or vector $\gamma[k]$ weights these homogenous solutions to meet one or more of such constraints. The resulting value of $C[k]$ then updates the value of $T_{BCn+1}[k+1]$ to allow solving Eq. (A8) for $C_\beta[k+1]$ at the next index $k \leftarrow k+1$.

Deferring the calculation of $\gamma[k]$ is also facilitated by substituting Eq. (A7) into Eq. (A4) to give the dependence of the link instantaneous screw on $\gamma[k]$ as $$T_{Ci}[k] = T_{\gamma Ci}\gamma[k] + T_{\beta Ci}[k], \text{ where} \tag{A9}$$

$$T_{\gamma Ci} = \sum_{j=1}^{i-1} T_j C_{\gamma j}, \; T_{\beta Ci}[k] = \sum_{j=1}^{i-1} C_{\beta j}[k]T_j + T_{BCi}[k]$$

Substituting this expression of the instantaneous screw into Eq. (A6) does the same for the joint screw $$T_i[k+1] = \frac{1}{k+1} T_{\gamma i}\gamma[k] + T_{\beta i}[k+1], \text{ where} \tag{A10}$$

$$T_{\gamma i,r} = T_{\gamma Ci,r} \times T_i \text{ for } 1 \le r \le v,$$

$$T_{\beta i}[k+1] = \frac{1}{k+1} \tilde{T}_{Ci}[k] *_\times T_i[k]$$

and where $\tilde{T}_{Ci}[m]=T_{Ci}[m]$, m<k and $\tilde{T}_{Ci}[k]=T_{\beta Ci}[k]$. As with $C_{\gamma i}$, $T_{\gamma Ci}=[T_{\gamma Ci,1} \ldots T_{\gamma Ci,v}]$ and $T_{\gamma i}=[T_{\gamma i,1} \ldots T_{\gamma i,v}]$ are right-multiplied by scalar or column-vector $\gamma[k]$ for one or more guiding coefficients. For Lie product x, $T_{\gamma i,r}=T_{\gamma Ci,r} \times T_i$ is expressed over the range of guiding-coefficient index r. As with $C_\gamma$, the one or more constant columns of $T_{\gamma Ci}$ and $T_{\gamma i}$ to be multiplied by the one or more guiding coefficients are calculated once at the start of a series expansion.

Constraining the Added Degrees of Freedom

One source of an added constraint to a redundant robot considers a joint-rate vector $C_V(t)$ comprised of elements $C_{Vi}(t)=\delta\theta_i(t)/\delta x$. These elements represent a virtual displacement $\delta\theta_i(i)$ of joint angle $\theta_i$ at time t with respect to variation δx in parameter x. The trajectories of the joint screws $T_i(t)$ making up the columns of $A(t)$, however, are determined as before from the joint rates $C(t)$ on the actual displacement path. The virtual displacement satisfies $A(t)C_V(t)=0$ at all times t along that path.

The goal is to calculate the series of coefficients $\gamma[k]$ to guide displacement along the actual path to satisfy a condition on passive joint rate $C_{Vi}(t)$ representing a virtual displacement. Whereas the selected active and passive joints in $C_V(t)$ represent a single virtual displacement, $C_{V,r}(t)$ will represent one of multiple virtual displacement selected by index r. In each such virtual displacement, initial series coefficient $C_V[0]=C_V(0)$ is determined by solving $AC_V[0]=0$ from one or more active joint rates among the elements of $C_V$ driving the virtual displacement. Initial $C_V[0]$ is in this way determined by the initial joint angles of the robot along its actual displacement path. Successive coefficients $C_V[k+1]$ for $k\geq 0$ will be seen to be linear in the elements of the guiding vector $\gamma[k]$ with a constant offset. This occurs upon expanding $A(t)C_V(t)=0$ and separating terms according to $$AC_V[k+1] + \sum_{i=1}^{n} \tilde{C}_{Vi}[k+1] * T_i[k+1] = 0 \qquad (A11)$$

where $\tilde{C}_{Vi}[m]=C_{Vi}[m]$ apart from $\tilde{C}_{Vi}[k+1]=0$. According to Eq. (A10), scalar $\gamma[k]$ influences joint screw coefficients $T_i[k+1]$, which in turn determines $C_V[k+1]$ by Eq. (A11). Substituting $$C_V[k+1] = \frac{1}{k+1}C_{\gamma V}\gamma[k] + C_{\beta V}[k+1] \qquad (A12)$$

together with Eq. (A10) into Eq. (A11) and then grouping by dependence on $\gamma[k]$ gives formulas for the terms $$AC_{\gamma V} + \sum_{i=1}^{n} C_{Vi}[0]T_{\gamma i} = 0, \qquad (A13)$$

$$AC_{\beta V}[k+1] + \sum_{i=1}^{n} \tilde{C}_{Vi}[k+1] * T_i[k+1] = 0$$

Constant $C_{\gamma V}$ is an n×v matrix with the same structure as $C_\gamma$ that is also solved once at the start of a series expansion whereas $C_{\beta V}[k+1]$ is solved at each index $k\geq 0$. The manner in which $\gamma[k]$ controls the next series coefficient $C[k+1]$ by way of Eq. (A12) is key. Specifying one or more passive-joint entries of $C_V[k+1]$ will formulate a linear system of equations to be solved for $\gamma[k]$. That linear system will be constructed from elements taken from constant matrix $C_{\gamma V}$ and each successive $C_{\beta V}[k+1]$, that were in turn solved from the linear systems in Eq. (A13). Once guiding vector coefficient is known $\gamma[k]$, this completes the deferred solution to Eq. (A7) from which all the remaining kinematic series coefficients may be updates.

Algorithm 2: Given the initial joint screws $T_i$ comprising matrix A, solve for constants $C_\gamma$, $T_{\gamma C i}$, $T_{\gamma i}$ along with the one or more values for $C_V[0]$ and $C_{\gamma V}$ for one or more virtual displacements supplying constraints on one or more guiding coefficients. For each index starting at k=0, perform the following steps. Evaluate Eqs. (A8)-(A10) for $C_\beta[k]$ and $T_{\beta i}[k+1]$ followed by Eq. (A13) for one or more coefficients $C_{\beta V}[k+1]$. Solve Eq. (A12) for vector $\gamma[k]$ meeting a condition applied on the one or more virtual displacement coefficients $C_V[k+1]$ Use this value of $\gamma[k]$ in Eqs. (A7), (A9) and (A10) to update $C[k]$, $T_{Ci}[k]$ and $T_i[k+1]$ on the actual displacement path.

Optimizing Tool Deviation at One Point Along a Through-the-Singularity Avoidance Path In a guiding a single virtual displacement, Eq. (A12) becomes $$C_{\gamma V 7}\gamma[k]+(k+1)(C_{\beta V 7}[K+1]-C_{V 7}[k+1])=0$$

where subscript 7 denotes the joint-7 element of column vectors $C_{\gamma V}$, $C_{\beta V}[k+1]$ and $C_{V 7}[k+1]$. Having initial coefficient $C_{V 7}(0)=C_{V 7}[0]\neq 0$, $C_{V 7}(t)$ may be placed on a linear path restoring it to zero at t=1 by solving scalar $\gamma[0]$ to make $C_{V 7}[1]=-C_{V 7}[0]$, with $\gamma[k]$ making $C_{V 7}[k+1]=0$ for $k\geq 1$. By correcting in this way for any $C_{V 7}(t)\beta 0$ at the start of each successive step that may result from predictor error in the preceding step, the side condition $C_{V 7}(t)=0$ is "achieved and maintained" along an actual displacement path.

This single virtual-displacement procedure is applied in the Preferred Embodiment 1) over the course of the singularity locating maneuver to maintain the minimum tool deviation $\theta_7$, 2) when solving for the point giving the least-maximum deviation on the adjusted path of a spherical wrist, and 3) in order to pass through the least-maximum point upon executing the singularity avoidance maneuver With an offset wrist, finding the least-maximum point on the adjusted path requires guiding joints 4, 5 and 6 with joints 1, 2, 3, 7, 8 and 9 passive to meet rate $C_{V 7}(t)=0$ for each of the constant active-joint rates $C_{V 4}=1$, $C_{V 5}=1$ and $C_{V 6p}=1$. Applying Eq. (A12) to these three virtual displacements having rate vectors $C_{V,r}$ for $1\leq r\leq 3$ gives the linear system of equations $$\begin{bmatrix} C_{\gamma V 7,1,1} & C_{\gamma V 7,2,1} & C_{\gamma V 7,3,1} \\ C_{\gamma V 7,1,2} & C_{\gamma V 7,2} & C_{\gamma V 7,3,2} \\ C_{\gamma V 7,1,3} & C_{\gamma V 7,2,3} & C_{\gamma V 7,3,3} \end{bmatrix} \begin{bmatrix} \gamma_1[k] \\ \gamma_2[k] \\ \gamma_3[k] \end{bmatrix} + (k+1)\begin{bmatrix} B_1 \\ B_2 \\ B_3 \end{bmatrix} = 0 \qquad (A14)$$

$$B_r = C_{\beta V 7,r}[k+1] - C_{V 7,r}[k+1], \quad 1\leq r\leq 3$$

For example, constant coefficient $C_{\gamma V 7,3,1}$ at the end of the first row in Eq. (A15) is taken from row 7 and column 3 of matrix $C_{\gamma V,1}$, which is in Eq. (A12) for the first of three virtual displacements. The three virtual-displacement rates $C_{V 7\gamma}(t)$ for $1\leq r\leq 3$ are declined to zero on the interval $0\leq t\leq 1$ by coefficients appearing in Eq. (A14) set to $C_{V 7\gamma}[1]=-C_{V 7\gamma}[0]$ followed by $C_{V 7\gamma}[k+1]=0$.

Optimizing Tool Deviation at Two Points Along an Around-the-Singularity Avoidance Path Points on the actual path before and after the singularity are to be connected by an avoidance path that maintains joint rates $C_4$ and $C_9$ in a constant ratio. Along such a path not passing through the wrist singularity and maintaining the specified trace of the tool contact point with the work piece, tool deviation angle $\theta_7$ will increase from zero to a maximum, decrease from that maximum to cross zero, reach a maximum excursion of opposite sign and then decrease in magnitude until it reaches zero once more, reaching the actual path on the other side of singularity encounter. The objective is to achieve the least magnitude of the maximum of these two excursions occurring on this path.

The procedure from Appendix C locates either an extremum where the slope of tool deviation $\theta_7$ crosses zero, or a zero crossing of $\theta_7$ itself. Applying searches for zero slope and zero value in alternating sequence locates the pair of points along a singularity-avoidance path where both are locally of maximum tool deviation. Each of these points is then displaced by a different path-following procedure having the objective of shifting the intersections of the line through those points along the actual path before and after singularity. These displacements are coordinated to keep constant $\Delta\theta_4/\Delta\theta_9$ slope, same as rate-ratio limit $C_4/C_9$, when shifting that line. Each such displacement step has a secondary objective to achieve or maintain the local least-maximum of tool deviation at the displaced point. This is accomplished over the course of a step by adjusting this point along the line of slope $C_4/C_9$ to where $\theta_7$ is maximized along with adjusting $\theta_6$ to simultaneously minimize $\theta_7$, meeting the least-maximum condition at the end of that step. Satisfying the above conditions, the coordinated displacements shift the line to increase one of the least-maximum deviation values and decrease the other until the two deviations equalize in magnitude, achieving the global least-maximum tool deviation that occurs at two places along an around-the-singularity avoidance path.

The optimization procedure is conducted by the methods using one guiding coefficient to direct the coordinated actual displacement applied equally to each point in shifting the line of constant $C_4/C_9$. Two more guiding coefficients are applied independently at each point to direct a pair of virtual displacement to zero to meeting the least-maximum stationarity condition at the end of a displacement step. Joints 1, 2, 3, 5, 7, and 8 are made passive to both the actual and virtual displacements. The active joints guided by coefficient $\gamma_2$ in Eq. (A7) are $C_{\gamma 4,2}=1$ and $C_{\gamma 9,2}=C_9/C_4$ (the reciprocal of slope $C_4/C_9$), and those for $\gamma_3$ are $C_{\gamma 3,6}=1$. The active joints for $\gamma_1$ are $C_{\gamma 4,1}=1$ and $C_{\gamma 9,1}=\sqrt{-C_9/C_4}$ for $C_9/C_4<0$, $C_{\gamma 9,1}=-\sqrt{C_9/C_4}$ $C_9/C_4>0$. This selection applies the coordinated displacement to the two points in a direction that is observed on average, to reduce the amount $\gamma_2$ needs to slide the points along the line.

In the two virtual displacements, the first is seeded with active-joint coefficients $C_{V4,1}[0]=1$ and $C_{V9,1}[1]=C_9/C_4$. The second is seeded with $C_{V6p,2}[0]=1$; substituting joint 6p for 6, having unit joint axis direction $\omega_{6p}=\omega_7\times\omega_6$ in place of $\omega_6$, maintains numeric precision at small tool deflections $\theta_7$[57] where the virtual wrist becomes singular.

When joint 7 is the passive joint controlled in each of two virtual displacements, applying Eq. (A12) to the two virtual displacements represented by $C_{V,r}$ for $1\le r\le 2$ gives the linear system $$\begin{bmatrix} C_{\gamma V7,1,1} & C_{\gamma V7,2,1} & C_{\gamma V7,3,1} \\ C_{\gamma V7,1,2} & C_{\gamma V7,2,2} & C_{\gamma V7,3,2} \end{bmatrix}\begin{bmatrix} \gamma_1[k] \\ \gamma_2[k] \\ \gamma_3[k] \end{bmatrix} + \begin{bmatrix} B_1 \\ B_2 \end{bmatrix} = 0; \quad (A15)$$

$$B_r = (k+1)(C_{\beta V7,r}[k+1] - C_{V7,r}[k+1]), \quad r=1,2$$

For example, constant coefficient $C_{\gamma V7,3,1}$ at the end of the first row in Eq. (A15) is taken from row 7 and column 3 of matrix $C_{\gamma V,1}$, which is $C_{\gamma V}$ in Eq. (A12) for the first of two virtual displacements. Were the adjustment equalizing $|\theta_7|$ at the two points paused by setting $\gamma_1[k]=0$, the stationarity conditions at each point are to be met by solving for $\gamma_2[k]=\gamma_{o2}[k]$ and $\gamma_3[k]=\gamma_{o3}[k]$ when $C_{V7,r}[1]=-C_{V7,r}[0]$ followed by $C_{V7,r}[k+1]=0$ for $k>0$. This solution declines $C_{V7,r}(t)$ to zero over the interval $0\le t\le 1$. Upon conducting the adjustment with $\gamma_1[k]\ne 0$, solving $$\begin{bmatrix} C_{\gamma V7,1,1} & C_{\gamma V7,2,1} & C_{\gamma V7,3,2} \\ C_{\gamma V7,1,2} & C_{\gamma V7,2,2} & C_{\gamma V7,3,2} \end{bmatrix}\begin{bmatrix} 1 \\ \gamma_{12} \\ \gamma_{13} \end{bmatrix} = 0 \quad (A16)$$

obtains corrections $\gamma_1[k]\gamma_{12}$ and $\gamma_1[k]\gamma_{13}$ preserving the least-maximum condition achieved by Eq. (A15).

Equation (A16) is therefore solved once for the coefficients $\gamma_{12}$ and $\gamma_{13}$ for the influence of $\gamma_1[k]$ on $\gamma_2[k]$ and $\gamma_3[k]$, and Eq. (A15) is solved at each index k for baseline values $\gamma_{o2}[k]$ and $\gamma_{o3}[k]$, giving $$\gamma_2[k]=\gamma_{o2}[k]+\gamma_1[k]\gamma_{12}, \gamma_3[k]=\gamma_{o3}[k]+\gamma_1[k]\gamma_{13} \quad (A17)$$

With vector $\gamma[k]$ having in this way a single degree-of-freedom controlled by $\gamma_1[k]$, vectors $\gamma[k]$ are supplied to Eq. (A7) to control rates $C_7(t)$ in each of two coordinated displacements equalizing $|\theta_7|$. Its power series coefficient is thereby expressed as $$C_7[k]=C_{\gamma opt7}\gamma_1[k]+C_{\beta opt7}[k],$$

$$C_{\gamma opt7}=C_{\gamma 7,1}+\gamma_{12}C_{\gamma 7,2}+\gamma_{13}C_{\gamma 7,3},$$

$$C_{\beta opt7}[k]=C_{\gamma 7,2}\gamma_{o2}[k]+C_{\gamma 7,3}\gamma_{o3}[k]+C_{\beta 7}[k] \quad (A18)$$

Supplying the same guiding coefficient $\gamma_1[k]$ to points on the adjusting path before and after the zero crossing of $\theta_7$, $$\theta_{7before}+C_{7before}[0]=-(\theta_{7after}+C_{7after}[0]);$$

$$C_{7before}[k+1]=-C_{7after}[k+1], k\ge 0 \quad (A19)$$

linearly declines the before-and-after tool deviation mismatch to zero over the interval $0\le t\le 1$. Substituting Eq. (A18) for the "before" and "after" points into Eq. (A19) gives a single linear equation solvable for $\gamma_1[k]$, which in turn determines the remaining guiding coefficients by Eq. (A17). Such allows updating the necessary kinematic variables to complete the steps of Algorithm 2

Optimization Constraints Required for an Offset Wrist

For a step of length $t_h=1$, the displacement $\Delta\theta_4=\gamma_1(1)$, $\Delta\theta_9=\gamma_1(1)C_9/C_4$, evaluated from the series expansion of $\gamma_1(t)$ at $t=1$, series convergence benefits from limiting the step to a fraction of the distance to one of the two turning-point (path reversal) singularities that can occur with an offset wrist. The distance between the turning point at $(\theta_{9sing}, \theta_{4sing})$ and any point $(\theta_9, \theta_4)$ on the line is expressed in terms of $\gamma_1(t)$ by solving for unknowns $\gamma_{1max}$ and $\gamma_{2max}$ in the linear system $$\theta_{4sing}-\theta_4=C_{\gamma 4,1}\gamma_{1max}+C_{\gamma 4,2}\gamma_{2max},$$

$$\theta_{9sing}-\theta_9=C_{\gamma 9,1}\gamma_{1max}+C_{\gamma 9,2}\gamma_{2max} \quad (A20)$$

for $\gamma_{1max}$. Similarly, distances are calculated to the points $(\theta_{9init}, \theta_{4init})$ on each actual-path segment, where $\theta_{9init}$ is a minimum distance (such as 0.5°) from its corresponding turning point at $\theta_{9sing}$.

When the initial series coefficient $\gamma_1[0]$ exceeds either the convergence limits or 0.7 of the distance when approaching $(\theta_{9init}, \theta_{4init})$, $\gamma_1[0]$ is set to that limit and $\gamma_1[k+1]$ is set to zero for k>0. Such a step does not reach equalized $\theta_7$ at the two local least-maximum points on the line, but it has neither taken too large a step nor violated the $(\theta_{9init}, \theta_{4init})$ limit on either side. If a step is conducted within those limits allowing calculation of $\gamma_1[k+1]$, that step has equalized the local least-maxima and has found an optimal line intersecting the actual path before and after singularity encounter. Those intersection points can then be adjusted outward from the singularity to meet the acceleration limit[57].

If one of the two ($\theta_{9init}$, $\theta_{4init}$) limits remains active, a second optimization keeps the intersection at that ($\theta_{9init}$, $\theta_{4init}$) and equalizes the two local least maxima by reducing slope $\Delta\theta_4/\Delta\theta_9$. Each pair of points ($\theta_9$, $\theta_4$) keeps that intersection point by maintaining $$\theta_9(t) - \theta_{9init} = (\theta_4(t) - \theta_{4init})v(t) \quad (A21)$$

where v(t) is the reciprocal slope of the line varying over the displacement step starting with $v(0)=v[0]=C_9/C_4$. Taking the derivative of both sides gives $$C_9(t) = C_4(t)v(t) + (\theta_4(t) - \theta_{4init})\gamma_1(t), \gamma_1(t) = \dot{v}(t) \quad (A22)$$

having the power-series expansion $$C_9[0] = C_4[0]v[0] + (\theta_4[0] - \theta_{4init})\gamma_1[0], \quad (A23)$$

$$C_9[k+1] =$$

$$\left(\sum_{m=0}^{k+1} C_4[m]v[k+1-m] + \sum_{m=0}^{k+1} \theta_4[m]\gamma_1[k+1-m]\right) - \theta_{4init}\gamma_1[k+1]$$

Term-by-term integration of the series for $\dot{v}(t)=\gamma_1(t)$ and $\dot{\theta}_4(t)=C_4(t)$ gives $$v[k+1] = \frac{1}{k+1}\gamma_1[k], \theta_4[k+1] = \frac{1}{k+1}C_4[k]; k \geq 0$$

These relations allow replacing the second line of Eq. (A23) by $$C_9[k+1] = C_4[k+1]v[0] + (\theta_4[0] - \theta_{4init})\gamma_1[k+1] + C_{\beta v9}[k+1], \quad (A24)$$

$$C_{\beta v9}[k+1] = \sum_{m=0}^{k} C_4[m]\gamma_1[k-m]\left(\frac{1}{k+1-m} + \frac{1}{m+1}\right)$$

In this second optimization, $C_9[0]=C_4[0]v[0]=C_4[0]C_9/C_4$ and $C_9[k+1]=C_4[k+1]C_9/C_4$ leave the active joints guided by coefficient $\gamma_2$ in Eq. (A7) unchanged at $C_{\gamma 4,2}=1$ and $C_{\gamma 9,2}=C_9/C_4$. Similarly, the single active joint rate guided by $\gamma_1$ becomes $C_{\gamma 9,1}=\theta_4[0]-\theta_{4init}$, where the same $\theta_{4init}$ and different initial values of $\theta_4[0]$ at the two points on the line are supplied to the two coordinated displacements. In Eq. (A7), $C_\beta[0]$ is unchanged whereas $C_{\beta,9}[k+1]$ from Eq. (A24) is added to $C_\beta[k+1]$ for $k\geq 0$.

Similarly, the virtual displacement $A(t)C_V(t)=0$ for the passive variation $\delta\theta_7$ with respect to $\delta\theta_4$ and $\delta\theta_9=\delta\theta_4 v$, $v=C_9/C_4$ feeds to account for non-constant $v=v(t)$. For this the first of two virtual displacements, the time-varying active-joint rate $C_{V9}(t)=v(t)$ applies to column $T_9(t)$ contributing $$\sum_{m=0}^{k+1} T_9[m]C_{V9}[k+1-m] = \quad (A25)$$

$$T_9[k+1]C_{V9}[0] - T_9[0]C_{V9}[k+1] + \sum_{m=1}^{k} T_9[m]C_{V9}[k+1-m],$$

$$C_{V9}[k+1] = v[k+1] = \frac{1}{k+1}\gamma_1[k]$$

Term $T_9[k+1]C_{V9}[0]$ is already incorporated into the solution for $C_{\gamma V}$ in Eq. (A13) whereas $T_9[0]C_{V9}[k+1]$ needs to be added to $$\sum_{i=1}^{n} \tilde{C}_{Vi}[k+1] * \tilde{T}_i[k+1]$$

in that equation when solving for $C_{\beta V}[k+1]$.

Appendix B—Proximity to Singularity and Maximum Joint-Rate Ratio

The singularity exclusion cone depends on the maximum joint-rate ratio between either of joints 4 or 6 in the wrist and joint 9 for the tool motion. When called to pass inside that cone, deviating from the desired path by passing directly through the singularity can limit the joint rates.

When rotation centers WCP, TCP, and RCP (see FIG. 7) become coincident, the robot reduces to a spherical four-bar linkage having the unit joint axis directions $\omega_4$, $\omega_5$, and $\omega_6$ for the wrist along with $\omega_9$ for the tool. At closest approach to the singularity in FIG. 11, $\omega_4$, $\omega_6$, and $\omega_9$ are in the same plane whereas $\omega_5$ is normal to that plane. Loop closure requires $$C_4\omega_4 + C_5\omega_5 + C_6\omega_6 + C_9\omega_9 = 0$$

For wrist deflection $\theta_5$ giving the angle from the singular position, $\phi$ the angle of $\omega_9$ from $\omega_6$, $\omega_4=(0, \cos\theta_5, \sin\theta_5)$, $\omega_5=(1, 0, 0)$ $\omega_6=(0, 1, 0)$, $\omega_9=(0, \cos\phi, \sin\phi)$ gives solution $C_4=\sin\phi/\sin\theta_5$, $C_5=0$, $C_6=-(\cos\theta_5\sin\phi+\sin\theta_5\cos\phi)/\sin\theta_5=-\sin(\theta_5+\phi)/\sin\theta_5$ when $C_9=1$. Hence the rate ratio $|C_4/C_9|>1/\sin\theta_5$ axis direction $\omega_9$ pointed 90 deg in relation to $\omega_6$ and inside the exclusion cone of angle $\theta_5$: A ratio of 6 gives an exclusion cone below 10 deg.

Appendix C—Path-Following Procedure for Locating Kinematic Zeroes.

Operations conducted when planning the adjusted robot path encountering the singularity with a limit applied to a joint rate and acceleration require a procedure articulating the robot to bring a joint angle, its rate or a rate derivative (angular acceleration) to zero.

Such a procedure based on a reversion of series expands the inverse function $x=g(y)$ from the coefficients of $y=f(x)$, exchanging the roles of independent and dependent variable. Inverse function g is singular, however, at the pair of values x, y where the forward function has an inflection point. The Newton-Raphson method finding zero of $f(x)$ from its value and its derivative at a starting point x, may be regarded as a low-order reversion[58]; its iterations can diverge wildly near inflection $f'(x_1)=0$[59].

With a kinematic loop that admits a high-order power series, a high-order guided displacement procedure of the type describe in Appendix A potentially allows solving for a zero of a speed ratio over a large angle displacement of the guiding joint in one update step. Unfortunately, inflections of $f(x)$ giving the speed ratio as a function of a joint angle make g(y) singular. Even if that singularity is some distance from the zero in question, a high-order series converges slowly or even diverges if the step size is large in relation to the distance to the inflection singularity. Such remains the case even when taking a step in the opposite direction. Along with the complication of extending Appendix A to the rate derivative, $f(x)$ having an inflection on the scale of the distance to its zero motivates the following alternative.

Consider expanding $f(x)$ to high order, treating the truncated series as coefficients of polynomial $f_p(x)$, and solving for its first real root. This process is heuristic inasmuch as this polynominal is not $f(x)$. A high-order series truncation, however, gives small kinematic closure error when its steps are restricted in relation to distance to a known singularity. Taking a final step that is a fraction p of that limit makes the error of an order p expansion even smaller by $O(\rho^{p+1})$. The problem then is one of finding the first real root $x_0>0$, if any, of a polynomial. Newton-Raphson iterations are of low calculation cost when applied to a polynomial relative to function evaluations of the kinematic problem. Those iterations are prevented from overshooting the root by applying them to a bounding polynomial. The procedure used for course adjustments[57] is improved by considering all cases of the quadratic portion of this polynomial to insure it contains one real root. The following also allows dispensing with reversion of series for the final, fine adjustment at minor increase in calculation cost.

The approximating polynomial $f_p(x)=f_p[0]+f_p[1]x+f_p[2]x^2+\ldots+f_p[p]x^p$ is normalized so that $f_p[0]=f_p(0)\geq 0$ without changing its roots. If $f_p(0)=0$, the first root already located. The lower-hound polynomial $\check{f}_p(x)$ retains the quadratic coefficients $f_p[0]$, $f_p[1]$, $f_p[2]$ and sets all positive coefficients $f_p[i]$ for $2<i\leq p$ to zero. This guarantees that $\check{f}_p(x)\leq f_p(x)$ for positive x and that its first real root is a lower hound on the roots of $f_p(x)$. Function leaves out the quadratic terms of $\check{f}_p(x)$, insuring $\check{f}_{3,p}(x)\leq 0$ for $x\geq 0$ making it either constant or monotone down.

Figure 22:
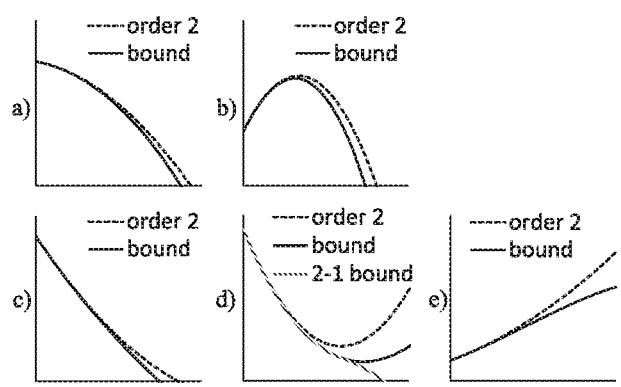
FIG. 22 shows cases of quadratic functions (dashed lines) and their lower-bound polynomials (solid lines).

Considering the relationships between its order 2 quadratic part and the complete bounding polynomial in FIG. 22, case a) has a quadratic of initial negative slope and curvature whereas case c) has negative slope, positive curvature and its first real root on the positive real line. Both quadratics are monotone down, to which is added a nonpositive monotone function $\check{f}_{3,p}(x)$, establishing $\check{f}_p(x)$ to be monotone down in the interval up to the root of the quadratic. The bounding polynomial $\check{f}_p(x)$ therefore has one real root between zero and this location.

In case b), both the quadratic and the bounding polynomial $\check{f}_p(x)$ are initially of upward slope and downward curvature. Both functions will continue to increase until they reach their respective slope inflection points. Hence $\check{f}_p(x)$ has no real root until after its inflection. Between its inflection point and the positive-real root of the downwardly curved quadratic, $\check{f}_p(x)$ has one real root.

In case e) where both functions are initially of positive slope and upward curvature, the bounding polynomial $\check{f}_p(x)$ will continue to increase until it passes first its curvature inflection followed by its slope inflection. After that, $\check{f}_p(x)$ is monotone down if $\check{f}_{3,p}(x)$ has at least one non-zero coefficient. It follows that $\check{f}_p(x)$ has only one real root on the positive real line. As the quadratic has no real root on that interval, $\check{f}_p(x)$ would need to be sampled at increasing intervals to determine where it changes sign, marking the upper limit on a single real root. This condition is taken to be the absence of a root, and the search stops.

In case d), the quadratic is downward sloping but upward curving with no real roots. The bounding polynomial $\check{f}_p(x)$ cannot be guaranteed to be monotone down, and FIG. 22 shows an example $\check{f}_p(x)$ that has an inflection between negative and positive slope before it will eventually have another inflection making it monotone down. There is no simple means to judge the bound function to have a single real root on an interval. On this one case, and in exchange for reducing the order of the error term, the quadratic is maintained up to its minimum in FIG. 22, after which it is replaced by a constant of that minimum value. A non-zero $\check{f}_{3,p}(x)$ makes the resulting piecewise function of the "2-1 bound" monotone down. It also gives the bound function negative slope at the location of the parabolic minimum. A single outward Newton-Raphson iteration using that slope finds the upper limit of an interval containing one real root. A zero $\check{f}_{3,p}(x)$ results in a bound function that does not trend downward, and this condition is also taken to be the absence of a root, and the search stops.

In a series reversion, the length of a step is known before conducting the expansion, allowing the expansion to correct the error from the previous step. Such a corrector is not as easily combined with the predictor step here in the non-reversion method. Function $f(x)$ needs to be expanded at the start of the step to obtain its bounding polynomial $\check{f}_p(x)$ giving a step limit not overrunning the zero. Reducing the step length to meet this limit under-applies any correction combined into the expansion of $f(x)$. The non-reversion method is therefore conducted with a separate, 2nd order corrector, the calculation time penalty=being under $20\%^{48}$. The following estimates the first zero of $\theta_z^{\{d\}}$, where d is the order of the derivative of the angle of a passive joint.

---

Algorithm 3:

method findZeroAngleDerivative(int d,
    return boolean success)
{
  Apply corrector;
  Conduct series expansion for predictor;
  Evaluate $\theta_{z1}^{\{d\}}$ from series coefficients;
  $\theta_{z0}^{\{d\}} \leftarrow \theta_{z1}^{\{d\}}$ ; $t_0 \leftarrow$ tZeroBound ($\theta_z^{\{d\}}$ [0...p − d]);
  while ( $t_0 > 10^{-12}$ && $\theta_{z1}^{\{d\}} \theta_{z0}^{\{d\}} > |\theta_{z0}^{\{d\}}| 10^{-10}$ ) {
    $t_x \leftarrow$ maxStep( );
    // Limits steps approaching zero to $.14 t_x$
    if ( $t_0 \geq .14 t_x$ )
        {$t_0 \leftarrow (1 − .07)t_x$ ; if ($t_0 > t_x$) $t_0 \leftarrow t_x$ ;}
    Update kinematic variables at $t_0$
        from series expansion;
    Apply corrector;
    Conduct series expansion for predictor;
    Evaluate $\theta_{z1}^{\{d\}}$ from series coefficients;
    $t_0 \leftarrow$ tZeroBound($\theta_z^{\{d\}}$ [0... p − d]);
  }
  success = $t_0 > 0$ || $\theta_{z1}^{\{d\}} \theta_{z0}^{\{d\}} \leq |\theta_{z0}^{\{d\}}| 10^{-10}$ ;
}

---

REFERENCES

1. Cheng S K, Jean M R, McGee H D, et al. *Method of Controlling a Robot through a Singularity*. U.S. Pat. No. 6,845,295, 2005.
2. EPX1250 Versatile Coating Robot (Yaskawa).
3. Wampler C W. Inverse Kinematic Functions for Redundant Manipulators. In: *IEEE International Conference on Robotics and Automation Proceedings*. IEEE, pp. 610-617,
4. Wang X, Zhang D, Zhao C, et al. Singularity analysis and treatment for a 7R 6-DOF painting robot with non-spherical wrist. *Mechanism and Machine Theory* 2018; 126: 92-107.
5. Rosheim M E. *Robot Wrist Actuators*. New York: Wiley, 1989.
6. Milenkovic V. New Nonsingular Robot Wrist Design. In: *Robots 11 Conference Proceedings RI/SME*. 1987, p. 13.29-13.42.
7. Stanisic M M, Duta O. Symmetrically Actuated Double Pointing Systems: The Basis of Singularity-Free Robot Wrists. *IEEE Transactions on Robotics and Automation* 1990; 6: 562-569.
8. Wiitala J M, Stanisic M M, Design of an Overconstrained and Dextrous Spherical Wrist. *ASME Journal of Mechanical Design* 2000; 122:347-353.

9. Milenkovic P. Non-Singular Spherically Constrained Clemens Linkage Wrist. *ASME Journal of Mechanisms and Robotics* 2011; 3: 011014-1.
10. Medium Payload Intelligent Robot: FANUC Robot M-710ic, http://www.fanucroboties.com/cmsmedia/datasheets/M-710iC%20Series_178.pdf (2013).
11. Wampler C W. Inverse Kinematic Functions for Redundant Spherical Wrists. *IEEE Transactions on Robotics and Automation* 1989; 5: 106-111.
12. Kieffer J. Differential Analysis of Bifurcations and isolated Singularities for Robots and Mechanisms. *IEEE Transactions on Robotics and Automation* 1994; 10: 1-10.
13. Allgower E L, Georg K. Introduction to Numerical Continuation Methods. Philadelphia, Pa.: SIAM, http://books.google.com/books?hl=en&lr=&id=yGAiYY-CJ3rkC&oi=frid&pg=PR4&4-Allgower+Georg&ots=WIT8hbtSrl&sig=34jYZcUHCCIk479zP7Ssiz-WjMG4 (2003, accessed 6 Aug. 2014).
14. Lloyd J E. Desingularization of Nonredundant Serial Manipulator Trajectories using Puiseux Series. *IEEE Transactions on Robotics and Automation* 1998; 14: 590-600.
15. Huang Y, Yong Y S, Chiba R, et al. Kinematic Control with Singularity Avoidance for Teaching-Playback Robot Manipulator System. *IEEE Transactions on Automation Science and Engineering* 2016; 13: 729-742.
16. Wampler C W. Manipulator Inverse Kinematic Solutions Based on Vector Formulations and Damped Least-Squares Methods. *IEEE Transactions on Systems, Man and Cybernetics* 1986; 16: 93-101.
17. Nakamura Y, Hanafusa H, inverse Kinematic Solutions with Singularity Robustness for Robot Manipulator Control. *ASME Journal of Dynamic Systems, Measurement, and Control* 1986; 108: 163-171.
18. Chiaverini S, Egeland O. A Solution to the Singularity Problem for Six-joint Manipulators. In: *IEEE International Conference on Robotics and Automation*, 1990, pp. 644-649.
19. Chiaverini S, Siciliano B, Egeland), a Review of the damped least-squares inverse kinematics with experiments on an industrial robot manipulato. *IEEE Transactions on Control Systems Technology* 1994; 2: 1:23-134.
20. Tsai L W. *Robot Analysis: The Mechanics of Serial and Parallel Manipulators*. New York: John Wiley and Sons, 1999.
21. Wan Y, Kou Y, Liang X. Closed-Loop Inverse Kinematic Analysis of Redundant Manipulators with Joint Limits. In: *International Conference on Mechanical Design. Springer*, 2017, pp, 1241-1255.
22. Nakamura Y. Advanced Robotics: Redundancy and Optimization. Reading, Mass. Addison-Wesley Longman Publishing Co., Inc., 1991.
23. Corinaldi D, Callegari M, Angeles J. Singularity-free path-planning of dexterous pointing tasks for a class of spherical parallel mechanisms. *Mechanism and Machine Theory* 2018; 128: 47-57.
24. Kim D-E, Park D-J, Park J-H, et al. Collision and Singularity Avoidance Path Planning of 6-DOF Dual-Alin Manipulator. In: *International Conference on Intelligent Robotics and Applications*. Springer, 2018, pp. 195-207.
25. Chembuly V, Voruganti H K. An Optimization Based inverse Kinematics of Redundant Robots Avoiding Obstacles and Singularities. In: *Proceedings of the Advances in Robotics*. ACM, 2017, p. 24.
26. Macicjewski A A, Klein C A. Numerical Filtering for the Operation of Robotic Manipulators through Kinematically Singular Configurations. *Journal of Robotic Systems* 1988; 5: 527-552.
27. Buss S R, Kim J-S. Selectively Damped Least Squares for Inverse Kinematics. *Journal of Graphics, GPU, and Game Tools* 2005; 10: 37-49.
28. Oetomo D, Ang, Jr. M H. Singularity Robust Algorithm in Serial Manipulators. *Robotics and Computer-Integrated Manufacturing* 2009; 25: 122-134.
29. Sun T, Liang D, Song Y. Singular-perturbation-based nonlinear hybrid control of redundant parallel robot. *IEEE Transactions on industrial Electronics* 2018; 65: 3326-3336.
30. Huang B, Milenkovic V. *Method to Avoid Singularity in a Robot Mechanism*. U.S. Pat. No. 4,716,350, 1987.
31. Milenkovic V, Huang B. Development On an Algorithm Negotiating Wrist Singularities. In: *Robot 11/17th ISIR*, pp. 13-1:13-6.
32. Aboaf E W, Paul R P. Living with the Singularity of Robot Wrists. In: *IEEE International Conference on Robotics and Automation*. 1987, pp. 1713-1717.
33. Milenkovic P. Series Solution for Finite Displacement of Single-loop Spatial Linkages. *ASME Journal of Mechanisms and Robotics* 2012; 4: 021016.
34. Oetomo D L, Ang V M H, Lim T M. Singularity Robust Manipulator Control using Virtual Joints. In: *ICRA '02 Proceedings*. 2002, pp. 2413-2423.
35. Long G L, Paul R P, Fisher W D. The Hamilton Wrist: A Four-Revolute-Joint Spherical Wrist Without Singularities. In: *IEEE International Conference on Robotics and Automation*, 1989, pp. 902-907.
36. Garcia C B, Zangwill W I. *Pathways to Solutions, Fixed Points, and Equilibria*. Englewood Cliffs, N.J.: Prentice-Hall, 1981.
37. Ambike S, Schmiedeler J P. A Methodology for Implementing the Curvature Theory Approach to Path Tracking with Planar Robots. *Mechanism and Machine Theory* 2008; 43: 1225-1235.
38. Bennett G T. The Skew Isogram Mechanism. *Proceedings of the London Mathematical Society* 1914; 13: 151-173.
39, Delassus E. Les Chaines Articulees Fermees et Deformables a Quatre Membres. *Bulletin des Sciences Mathernatiques, 2nd series* 1922; 46: 283-304.
40. Waldron K J. A Study of Overconstrained Linkage Geometry by Solution of Closure Equations-Part I. Method of Study, *Mechanism and Machine Theory* 1973; 8: 95-104.
41. Snyder J P. *Map Projections: A Working Manual*, US Government Printing Office, 1987.
42. Todhunter I. *Spherical Trigonometry, for the Use of Colleges and Schools 5th Edition*, Cambridge: Macmillan, 1886.
43. Paul R P, Stevenson C N. Kinematics of robot wrists. *The International Journal of Robotics Research* 1983; 2: 31-38.
44. Huang B, Milenkovic V. Kinematics of Minor Robot Linkage, In: *Robotics Research: The Next Five Years and Beyond*. RI/SME, 1984, pp. MS84-496.
45. Apostol T M. *Mathematical Analysis, Second Edition*, Reading, Mass.: Addison-Wesley, 1974.

46. Milenkovic P. Projective Constraint Stabilization for a Power Series Forward Dynamics Solver. *ASME Journal of Dynamic Systems, Measurement, and Control* 2013; 135: 031004.
47. Milenkovic, P. H. *Kinematic predictor for articulated mechanisms*. U.S. Pat. No. 9,031,699 B2, 2015.
48. Milenkovic. P. Effect of the coordinate frame on high-order expansion of serial-chain displacement. *Proceedings of the Institution of Mechanical Engineers, Part K: Journal of Multi-body Dynamics* 2019; 840-855,
49. Milenkovic. P. Solution of the Forward Dynamics of a Single-loop Linkage Using Power Series. *ASME Journal of Dynamic Systems, Measurement, and Control* 2011; 133: 061002.
50. Featherstone R. *Rigid Body Dynamics Algorithms*, New York: Springer, 2008.
51. Featherstone R. Plucker basis vectors. In: Proceedings 2006 *IEEE International Conference on Robotics and Automation*. 2006, pp, 1892-1897.
52. Karsai G. Method for the Calculation of the Combined Motion Time Derivatives of Optional order and Solution for the Inverse Kinematic Problems. *Mechanism and Machine Theory* 2001; 36: 261-272.
53. Ciriewank A, Walther A. On the efficient generation of Taylor expansions for DAE solutions by automatic differentiation. In: Dongarra J, Madsen K, Wasniewski J (eds). Springer, 2006, pp. 1089-1098.
54. Ambike S, Schmiedeler J P, Stanisic M M. Trajectory Tracking via Independent Solutions to the Geometric and Temporal Tracking Subproblems. *ASME Journal of Mechanisms and Robotics* 2011; 3: 021008.
55. Muller A, Higher Derivatives of the Kinematic Mapping and Some Applications. *Mechanism and Machine Theory* 2014; 76: 70-85.
56. Muller A. Higher-order analysis of kinematic singularities of lower pair linkages and serial manipulators. *Journal of Mechanisms and Robotics* 2018; 10: 011008.
57. Milenkovic P. Continuous path control for optimal wrist singularity avoidance in a serial robot. *Mechanism and Machine Theory* 2019; 140: 809-824.
58. Bickley W G. 1587. An Extension of Newton's Formula for Approximating to the Roots of Equations. *The Mathematical Gazette* 1942; 26: 102-104.
59. Press W H. *Numerical Recipes in Pascal*. New York: Cambridge University Press, 1989.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

References to "a microprocessor" and "a processor" or "the microprocessor" and "the processor," can be understood to include one or more microprocessors that can communicate in a stand-alone and/or a distributed environment(s), and can thus be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim,

What I claim is:

1. A robot control system for a multi-axis robot having multiple links including an end link defining a tool position, the links movable with respect to each other at joints defining axes and having sensors and actuators for movement of the joints about the axes by the actuators according to the sensors subject to joint movement rate limits, the joints and links configured so as to present at least one singularity, the controller comprising:
   an electronic circuit communicating with the actuators and sensors at each joint and executing a stored program to:
   (a) receive path instructions defining a path of desired changes in tool orientation along with desired positional velocity occurring along this path;
   (b) identifying at least one unmodified path portion proximate to the singularity exceeding at least one joint movement rate limit at the desired positional velocity;
   (c) identifying a modified path portion providing the desired velocity and the desired tool position without exceeding the at least one joint movement rate limit of (b) according to a minimization of a maximum accumulated deviation of a tool orientation of the modified path portion from a tool orientation of the unmodified path portion taken over the entirety of the modified path portion.

2. The robot control system of claim 1 wherein the modified path does not intersect the singularity.

3. The robot control system of claim 1 wherein the modified path intersects the singularity.

4. The robot control system of claim 1 wherein step (c) identifies alternative modified path portions providing the desired velocity and the desired tool position without exceeding the at least one joint movement rate limit of (b) according to a minimization of a maximum deviation of a tool orientation of the modified path portion from a tool orientation of the unmodified path portion; and
further including the step of receiving path instructions describing at least one region where path rerouting is prohibited and wherein step (c) identifies the modified path portion to minimize the deviation among the alternative modified paths not including the at least one region.

5. The robot control system of claim 1 wherein step (c) further identifies a modified path portion according to a minimization of a length of the modified path portion.

6. The robot control system of claim 1 wherein step (c) further identifies a modified path portion that limits at least one of joint maximum acceleration and joint maximum velocity among joints of the multi-axis robot to at least one predetermined value.

7. The robot control system of claim 6 wherein step (c) further identifies a modified path portion according to a predetermined lower limit of a length of the modified path portion.

8. The robot control system of claim 1 wherein the three axis robot wrist provides a spherical roll-pitch-roll configuration and the singularity occurs when the two roll axes are collinear.

9. The robot control system of claim 1 wherein the robot provides an offset wrist.

10. The robot control system of claim 1 further including a robot providing a total of six joints.

11. A robot control system for a multi-axis robot having multiple links including an end link defining a tool position, the links movable with respect to each other at joints defining axes and having sensors and actuators for movement of the joints about the axes by the actuators according to the sensors subject to joint movement rate limits, the joints and links configured so as to present at least one singularity, the controller comprising:
an electronic circuit communicating with the actuators and sensors at each joint and executing a stored program to:
(a) receive path instructions defining a path of desired changes in tool orientation along with desired positional velocity occurring along this path;
(b) identifying at least one unmodified path portion proximate to the singularity exceeding at least one joint movement rate limit at the desired positional velocity;
(c) identifying a modified path portion providing the desired velocity and the desired tool position without exceeding the at least one joint movement rate limit of (b) according to a minimization of a maximum deviation of a tool orientation of the modified path portion from a tool orientation of the unmodified path portion;
wherein step (c) models the robot as a closed kinematic system consisting of a base comprising a first link in that system supporting a first point supporting a first joint of the robot, through the joints of the robot then through a three axis virtual wrist sharing one axis with a final axis of the robot and then through a virtual joint connecting to a link on the path that is rigidly connected to the first link.

12. The robot control system of claim 11 wherein the virtual three axis wrist is constrained so that a first and third joint of the three axis wrist are constrained to move by equal and opposite angles.

13. The robot control system of claim 12 wherein virtual three axis wrist is constrained so that a second joint of the virtual wrist is perpendicular to a second joint in the robot wrist comprising the final three joints of the robot.

14. The robot control system of claim 11 wherein the three axis virtual wrist provides a spherical configuration.

* * * * *